(12) United States Patent
Rutherford et al.

(10) Patent No.: US 11,028,931 B2
(45) Date of Patent: Jun. 8, 2021

(54) FLOW CONTROL VALVE AND HYDRONIC SYSTEM

(71) Applicant: CGC GROUP OF COMPANIES INCORPORATED, Mississauga (CA)

(72) Inventors: Robert G. Rutherford, Mississauga (CA); William J. Browne, Newmarket (CA)

(73) Assignee: CGC GROUP OF COMPANIES INCORPORATED, Mississauga (CA)

( * ) Notice: Subject to any disclaimer, the term of this patent is extended or adjusted under 35 U.S.C. 154(b) by 80 days.

(21) Appl. No.: 16/335,442

(22) PCT Filed: Sep. 21, 2017

(86) PCT No.: PCT/CA2017/051112
§ 371 (c)(1),
(2) Date: Mar. 21, 2019

(87) PCT Pub. No.: WO2018/053635
PCT Pub. Date: Mar. 29, 2018

(65) Prior Publication Data
US 2019/0211937 A1    Jul. 11, 2019

Related U.S. Application Data

(60) Provisional application No. 62/397,701, filed on Sep. 21, 2016.

(51) Int. Cl.
*F16K 11/085* (2006.01)
*F16K 17/38* (2006.01)
(Continued)

(52) U.S. Cl.
CPC .............. *F16K 11/085* (2013.01); *F16K 5/12* (2013.01); *F16K 17/386* (2013.01); *F16K 31/04* (2013.01);
(Continued)

(58) Field of Classification Search
CPC .......... F16K 11/085; F16K 5/12; F16K 31/04; F24D 3/18
See application file for complete search history.

(56) References Cited

U.S. PATENT DOCUMENTS 4,071,078 A    1/1978 Padden
4,623,001 A    11/1986 Vogler et al.
(Continued)

FOREIGN PATENT DOCUMENTS

CN    10253420 A    7/2012
EP    1355095 B1    6/2006
(Continued)

OTHER PUBLICATIONS

International Search Report and Written Opinion with regard to PCT/IB2018/057075 dated Jan. 7, 2019.
(Continued)

*Primary Examiner* — Kevin R Barss
(74) *Attorney, Agent, or Firm* — BCF LLP

(57) ABSTRACT

A flow control valve comprises three orifices. Each of the three orifices is connectable to a fluid conduit, respectively. Each of two orifices of the three orifices is modulatable between a closed mode in which that orifice is substantially closed, and an open mode in which that orifice is open. Each of the two orifices is also modulatable between the closed mode and the open mode while the other one of the two orifices is in the closed mode. Depending on the application, the orifices may be used as inlets or outlets and in different combinations of inlets and outlets. A hydronic system that includes the flow control valve is also described.

41 Claims, 10 Drawing Sheets

(51) Int. Cl.
*F16K 5/12* (2006.01)
*F24D 3/18* (2006.01)
*F16K 31/04* (2006.01)

(52) U.S. Cl.
CPC ........ *F24D 3/18* (2013.01); *F24D 2220/0235* (2013.01); *F24D 2220/0264* (2013.01)

(56) References Cited

U.S. PATENT DOCUMENTS

| | | | |
|---|---|---|---|
| 4,883,226 | A | 11/1989 | Tomita et al. |
| 4,986,307 | A | 1/1991 | Hardee |
| 5,820,133 | A | 10/1998 | Altshuler |
| 6,539,899 | B1 | 4/2003 | Piccirilli et al. |
| 7,168,397 | B2 | 1/2007 | Chanfreau et al. |
| 8,235,709 | B2 | 8/2012 | Meagher et al. |
| 9,145,821 | B2 | 9/2015 | Lee et al. |
| 9,410,752 | B2 | 8/2016 | Wallace |
| 9,903,486 | B2 | 2/2018 | Eckberg et al. |
| 10,072,856 | B1 * | 9/2018 | Akin ................ F24F 5/0046 |
| 2014/0034168 | A1 | 2/2014 | Folkner |
| 2016/0273671 | A1 | 9/2016 | Chang et al. |

FOREIGN PATENT DOCUMENTS

| | | |
|---|---|---|
| EP | 2940357 A1 | 11/2015 |
| FR | 2480897 A3 | 10/1981 |
| WO | 2013173863 A1 | 11/2013 |

OTHER PUBLICATIONS

English Abstract for EP1355095 retrieved on Espacenet on Mar. 14, 2020.
English Abstract for CN102537420 retrieved on Espacenet on Feb. 25, 2019.
"Four Way Ball Valves", JDControls, http://www.jdvalves.com/four_way_ball_valves.htm accessed Mar. 14, 2020, pdf 3 pages.
International Search Report and Written Opinion with regard to PCT/CA2017/051112 dated Dec. 18, 2017.
International Preliminary Report on Patentability with regard to PCT/CA2017/051112 dated Jan. 2, 2019.
English Abstract of FR2480897 retrieved on Espacenet on Mar. 18, 2019.

* cited by examiner

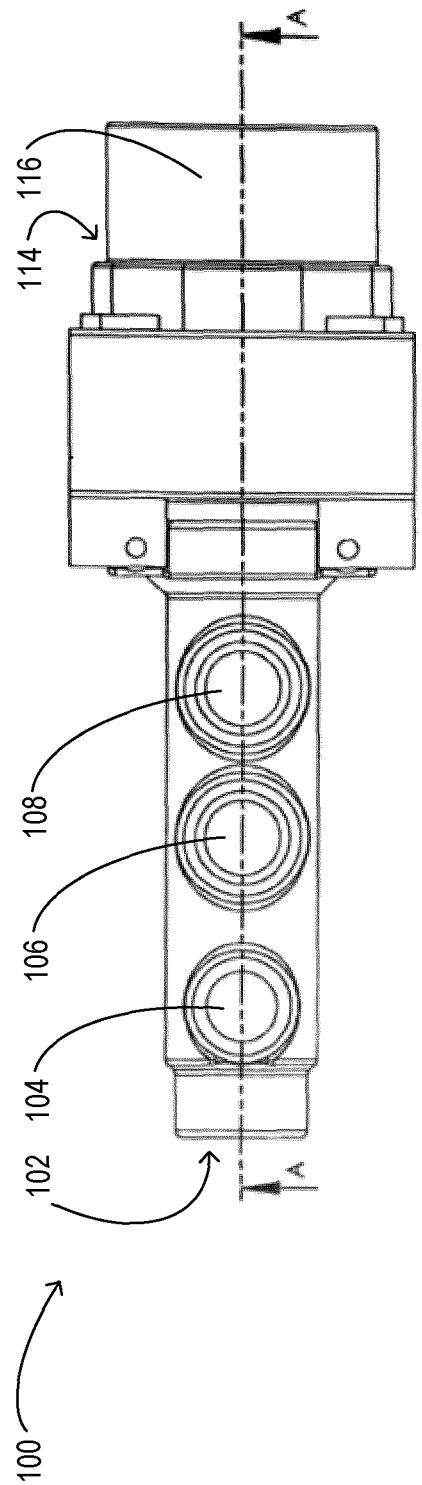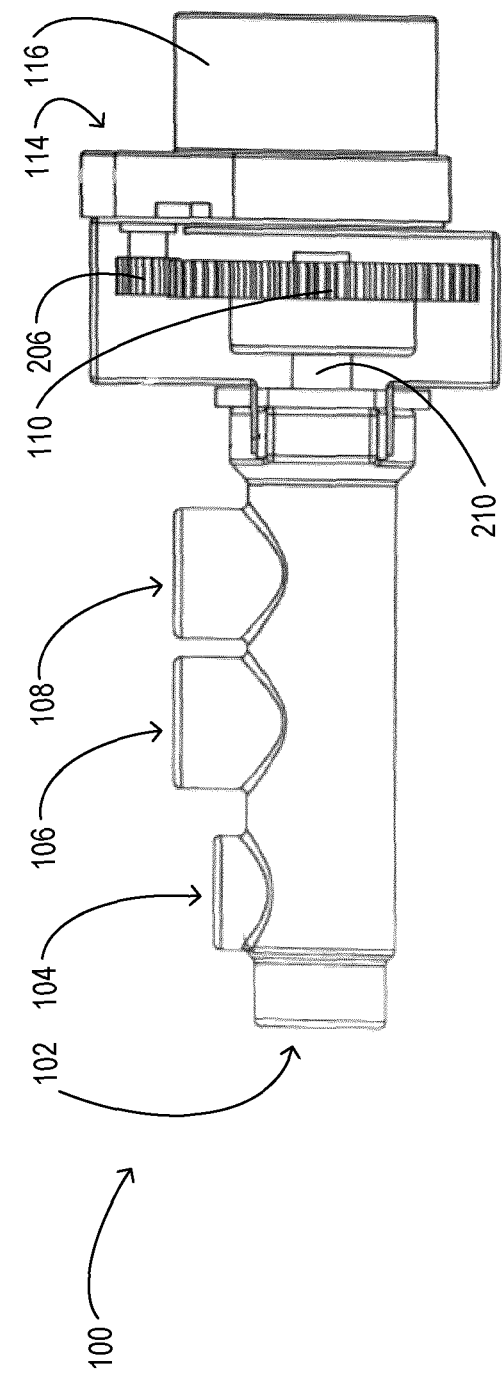
FIG. 2A
FIG. 2B

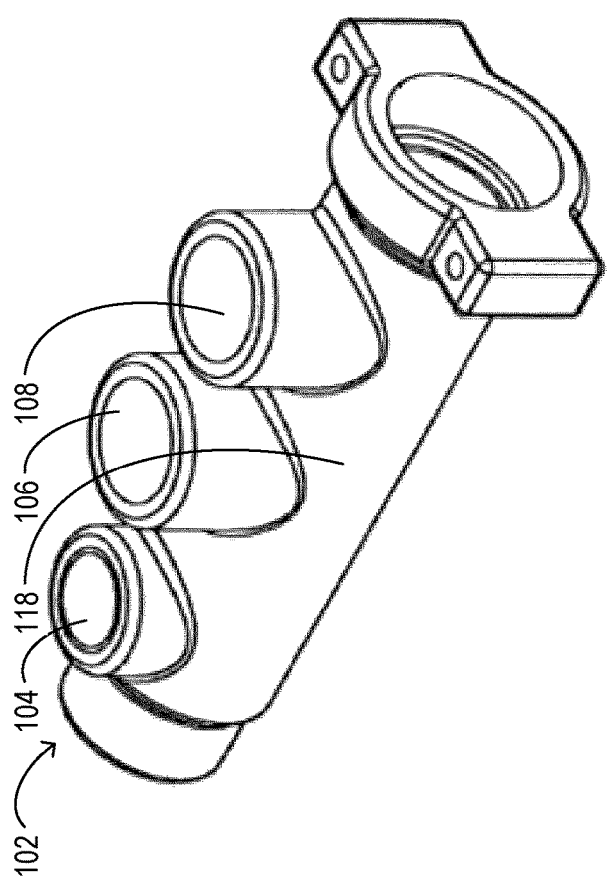
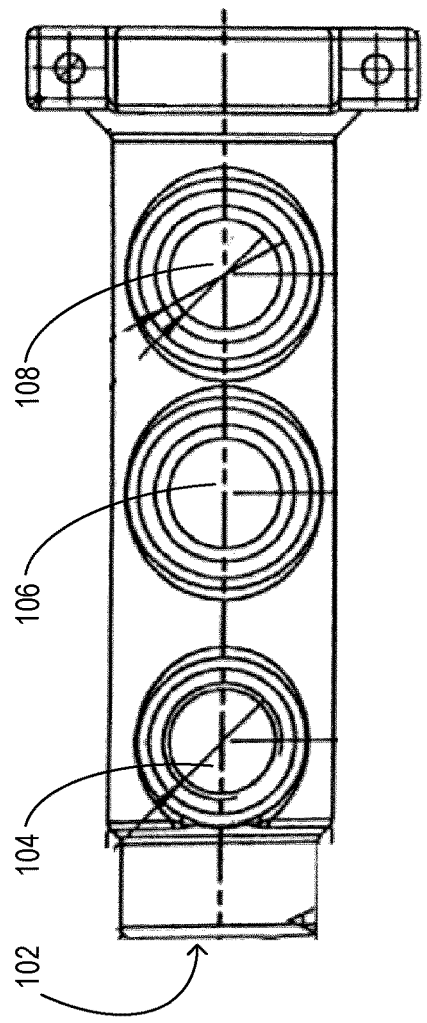
FIG. 5A
FIG. 5B

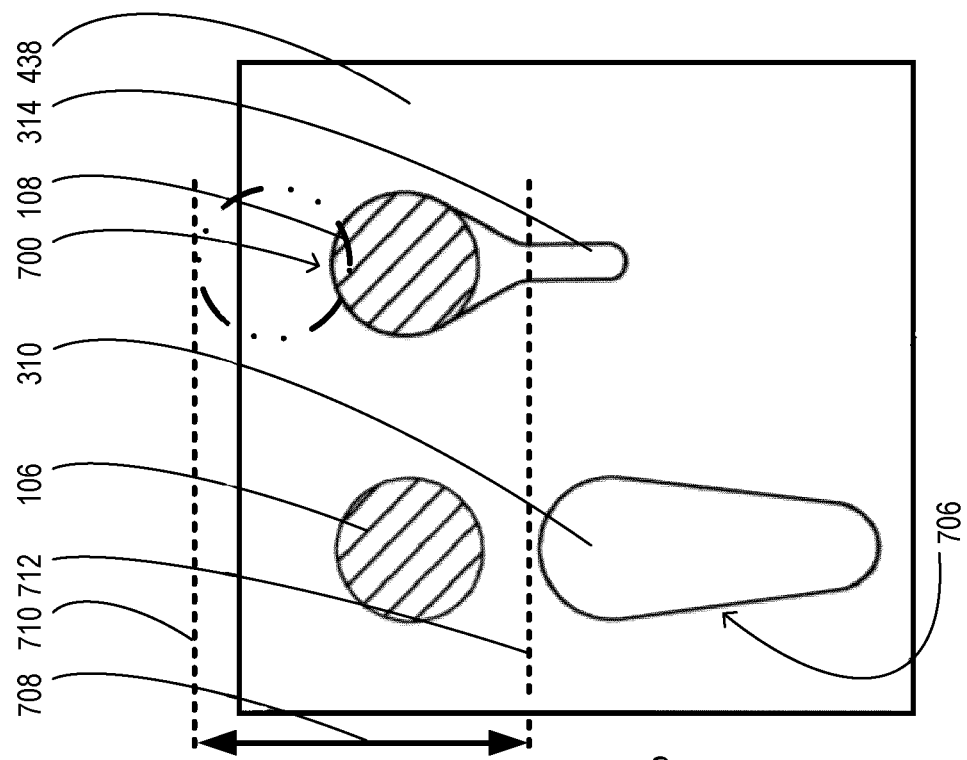
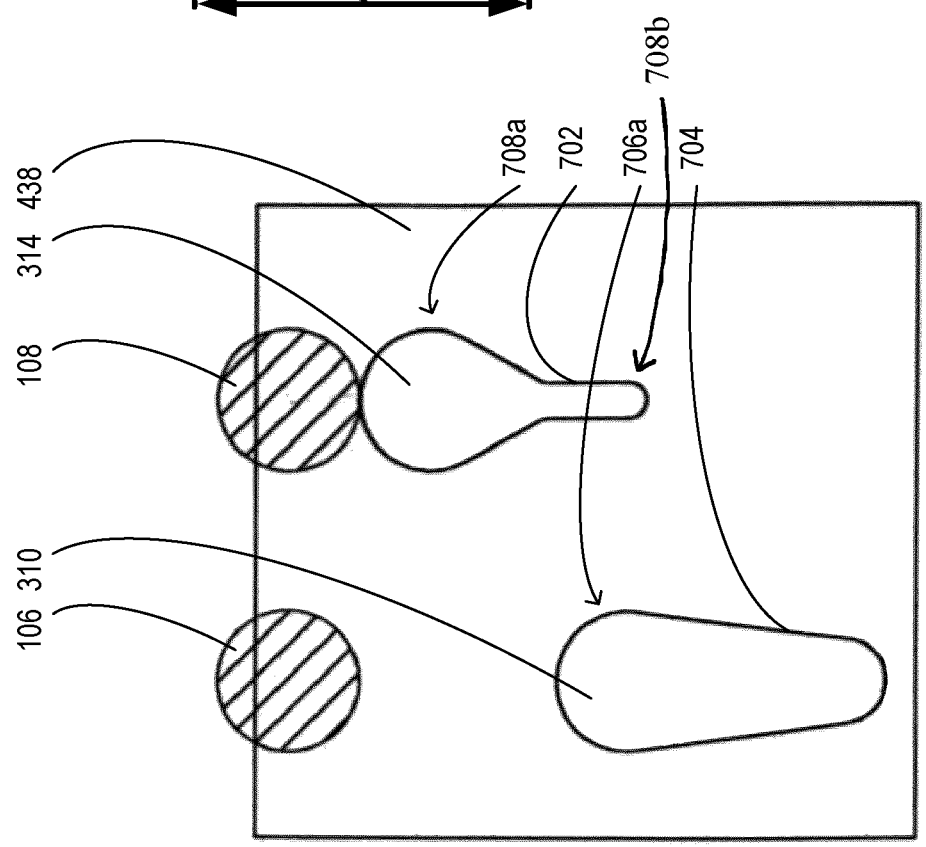

FLOW CONTROL VALVE AND HYDRONIC SYSTEM

CROSS-REFERENCE

The present application claims priority to U.S. Provisional Patent Application No. 62/397,701 filed Sep. 21, 2016, entitled "Flow Control Valve", which application is incorporated herein by reference in its entirety.

TECHNICAL FIELD

The implementations disclosed herein relate to flow control valves and hydronic systems.

BACKGROUND

Numerous valves, such as 2-way and 3-way flow control valves, are known. Such valves are often used to control fluid flow in various hydronic systems, such as heating, ventilating, hydronic ("HVAC"), and refrigeration systems. An example of a hydronic system is a water source heat pump system that may be implemented in a building to individually condition spaces, such as offices or condominium units, in the building. A heat pump system may use a single fluid loop to transfer heat to and from the heat pumps that may be present in the system.

A heat pump connected to the fluid loop may either take energy from the fluid in the fluid loop and inject it into at least one space served by the heat pump, or may reject heat from the at least one space into the fluid in the loop, depending on the possible heating, cooling, and dehumidification humidification demands of the at least one space. A standard water source heat pump system may include at least one heat pump in each space in which the climate is to be controlled by the at least one heat pump.

The fluid loop may be equipped with pumps that may circulate a fluid, such as water or a glycol solution, in the fluid loop, and thereby provide a supply of the fluid to each hydronic system, such as a heat pump, that may be connected to the fluid loop. A standard water source heat pump may use a compressor (or a plurality of compressors, depending on the configuration of that heat pump) connected with a direct expansion coil ("DX coil") to both heat and cool the at least one space conditioned by that heat pump.

A controller of the heat pump may operate the compressor(s) in one of two possible directions to reject heat from the space(s) into the hydronic loop in response to a cooling call, and in the other of the two possible directions to extract heat from the loop and transfer it to the at least one space via the DX coil. Standard heat pumps use at least one reversing valve in order to enable this operation. A number of inefficiencies may be associated with the operation of standard water source heat pumps.

In the last two decades, the North American HVAC industry has received encouragement from governments to mitigate operational inefficiencies of hydronic systems in order to reduce the impact of such systems on the environment. To help this cause, the CGC Group of companies has developed a hydronic system that will be further referred to as a hybrid (water source) heat pump. A hybrid heat pump may include in an air stream a hydronic coil in series with a DX coil. The hybrid heat pump may provide heating to the space(s) served by that heat pump via the hydronic coil, instead of using the DX coil.

Using the hydronic coil instead of the DX coil may avoid using the refrigerant compressor(s) connected with the DX coil and may thereby avoid the electricity consumption that is associated with running the refrigerant compressor(s). Thus, a hybrid heat pump may, at least in some cases, consume less electricity than a standard heat pump that operates refrigerant compressor(s) to provide heating.

In many jurisdictions, heat generated by electricity (for example, using resistance heaters or refrigerant compressors) is more expensive than heat generated by a source like natural gas (for example, by operating natural gas boilers to heat the fluid loop). Therefore, in at least some jurisdictions and for some applications, hybrid heat pumps may provide operational cost savings associated with lower electricity consumption.

Prior hybrid heat pump systems have used fluid loops with continuous and constant fluid flow throughout the loop and through each hybrid heat pump connected to that loop. The flow was constant twenty four hours per day, three hundred and sixty five days per year, irrespective of whether each hybrid heat pump was heating, cooling, or receiving no heating or cooling call and therefore not operating (further referred to as "idle"). In a drive to improve operating efficiencies of hydronic systems, some jurisdictions in North America have implemented requirements to reduce flow rates in hydronic system fluid loops and in individual hydronic systems, such as individual heat pumps, whenever possible.

For example, some jurisdictions in North America may require hydronic systems, such as heat pump systems, to stop flow to the hydronic systems whenever those systems are not operating (i.e. idle), and to modulate flow of fluid (that is, increase or decrease the flow, depending on the demand) through those systems when those systems are operating (i.e. cooling, heating, and/or dehumidifying at least one space).

To meet these requirements for a hydronic system such as a hybrid heat pump (a hybrid heat pump may be classified as a hydronic system), at least three flow control devices have heretofore been required. A first two-way valve has been required to modulate flow of fluid from a fluid loop into a condenser of a given hybrid heat pump, a second two-way valve has been required to modulate flow of the fluid from the fluid loop into the hydronic heating coil of the given heat pump, and at least one flow sensor has been required to monitor flow. In other examples, a combination of two-way valves and three-way valves may have been used.

A number of drawbacks and inefficiencies are associated with using three or more flow control devices to control a single hydronic system (for example, hybrid heat pump). In one aspect, each of the first and second two-way valves may require a dedicated actuator. In another aspect, a controller may be required that is capable of receiving a connection from each of the dedicated actuators and controlling each of the dedicated actuators. In yet another aspect, manufacturing a hydronic system having the three or more flow control devices may require piping, electrical connections, and controls for each of the devices.

SUMMARY

For the purpose of this document, the term "modulatable", used with respect to an orifice, means that the orifice can be modulated (for example, by changing the effective size of the orifice), in order to change a flow rate of a fluid that occurs through the orifice (which flow rate could include a zero flow rate) at a given set of conditions (for example, at a given pressure drop across the orifice). That is, for example, a lower flow rate of fluid will occur through an orifice at a given set of conditions when the orifice is modulated to provide a smaller effective opening for the fluid to flow through.

For the purposes of this document, the term "conduit" refers to a notional conduit that supplies a fluid (such as, for example, air or a liquid) from one point to at least one other point. That is, for example, a given "air conduit" that delivers air from point A to point B could be defined by a single conventionally known air duct that supplies air from the point A to the point B, a plurality of conventionally known air ducts interconnected to supply air from the point A to the point B, or a combination of one or more conventionally known air ducts and other structures arranged to supply air from the point A to the point B Similarly, a conduit for a fluid such as a glycol solution is notional and could be defined by a single pipe, more than one pipe, or a combination of one or more pipes and other structures interconnected to deliver the fluid as specified with respect to the conduit. Also, one or more elements defining a given conduit need not be interconnected (flow-wise) in series, and could be interconnected (flow-wise) in parallel or in a combination of series and parallel fluid flow connections.

A single flow control device such as a flow control valve that may reduce the number of devices that may otherwise be required to control a single hydronic system may provide advantages.

According to one aspect of the present technology, there is provided a flow control valve that includes three orifices, each of the three orifices being connectable to a fluid conduit, respectively. Each of two orifices of the three orifices is modulatable between a closed mode in which that orifice is substantially closed, and an open mode in which that orifice is open, and between the closed mode and the open mode while the other one of the two orifices is in the closed mode.

In another aspect, each of the two orifices is modulatable within the open mode of that orifice while the other one of the two orifices is in the open mode of that orifice.

In a further aspect, each of the two orifices has an effective diameter, and the two orifices are modulatable to simultaneously decrease the effective diameter of each of the two orifices. In yet a further aspect, the two orifices are modulatable to simultaneously increase the effective diameter of each of the two orifices.

In a particular implementation, the flow control valve has a main body having the two orifices, and a port body having two ports. In this implementation, each port may be disposed in the port body relative to the two orifices such that may overlap at least partially with one of the two orifices when that orifice is in the open mode and substantially lack overlap with that orifice when that orifice is in the closed mode.

In another aspect, one of the port body and the main body may be disposed over and rotationally connected to the other one of the port body and the main body such that pivoting one of the port body and the main body relative to the other one of the port body and the main body modulates each of the two orifices between the open mode and the closed mode of that orifice.

In yet a further aspect, the two orifices may be modulatable between the open mode and the closed mode of that orifice by a single actuator operatively connected to the two orifices. In some examples, the single actuator may be operatively connected to one of the port body and the main body to pivot that one of the port body and the main body relative to the other one of the port body and the main body.

In other aspects, this document describes a flow control valve for controlling a flow of a fluid from a supply of the fluid. In a particular example, the flow control valve may be implemented with a hydronic system. In a more particular example, the flow control valve may be implemented with a hydronic system such as a hybrid heat pump. Other implementations of the flow control valve may also be possible.

In one aspect, this document describes a flow control valve comprising an inlet connectable to a supply of a fluid, and at least two outlet orifices. Each outlet orifice of the at least two outlet orifices may be modulatable between a closed mode in which that outlet orifice is substantially sealed from the inlet, and an open mode in which that outlet orifice is fluidly connected to the inlet. Each of the outlet orifices may be further modulatable between the closed mode and the open mode while another one of the at least two outlet orifices is in the closed mode. The open mode of each of the outlet orifices may include a most-open position and a partially open position of that outlet orifice.

Various flow conditions and operational modes of the flow control valve are described.

It will be appreciated that the conditions and modes are described such as they may occur when the inlet of the flow control valve is connected to a supply of a fluid (as opposed to when the flow control valve is not connected to a supply of a fluid, since it may be evident that no fluid flow can occur through the flow control valve in this case).

In one implementation, in the closed mode of each outlet orifice, substantially none of the supply of the fluid may pass through that outlet orifice. In the open mode of each outlet orifice, at least a portion of the supply of the fluid may pass through that outlet orifice.

In another implementation, in the closed mode of at least one of the at least two outlet orifices, that outlet orifice may be substantially sealed from the inlet such that a marginal flow may pass through that outlet orifice in the closed mode. The marginal flow may be in magnitude less than a predefined percentage of a most-open flow rate through that outlet orifice. The most-open flow rate may be a flow rate of the fluid that passes through that outlet orifice when that outlet orifice is in the most-open position. In a particular example, the predefined percentage is five percent.

In one aspect, each outlet orifice of the flow control valve may be modulatable within the open mode of that outlet orifice to modulate a rate of flow of the fluid that may pass through that outlet orifice in the open mode of that outlet orifice.

In another aspect, each outlet orifice of the flow control valve may be modulatable within the open mode of that outlet orifice while another one of the outlet orifices is in the open mode of that outlet orifice.

In yet another aspect, the outlet orifices of the flow control valve may be modulatable to simultaneously reduce the portion of the supply of the fluid that passes through each of the outlet orifices in the open mode of that outlet orifice. The outlet orifices may also be modulatable to simultaneously increase the portion of the supply of the fluid that passes through each of the outlet orifices in the open mode of that outlet orifice.

In a further aspect, the outlet orifices of the flow control valve may be modulatable by a single actuator.

In one example, the flow control valve may be implemented in a hydronic system, such as a hybrid heat pump, to enable a cooling mode, a heating mode, a dehumidification mode, and an idle mode of the hydronic system.

In a more particular example, the flow control valve may have two outlet orifices and a single actuator operable to modulate the two outlet orifices, and the flow control valve may be implemented with a hydronic system comprising the flow control valve. In this particular example, the cooling, heating, dehumidification, and idle modes of operation of the example hydronic system are enabled by the (single) valve.

The example hydronic system may comprise a direct expansion coil operable with a condenser to cool an incoming airstream, a hydronic coil operable to heat the incoming airstream, a controller, and a flow sensor connected to a sensor port at the inlet of the flow control valve upstream of the two outlet orifices. The flow sensor may be in electronic communication with the controller, a condenser outlet orifice of the two outlet orifices may be fluidly connected to the condenser, a heating outlet orifice of the two outlet orifices may be fluidly connected to the hydronic coil, and the single actuator may be in electronic communication with the controller.

The example hydronic system may serve an example space. The example space may have a space sensor. The controller may be operable with the flow sensor to produce a control signal in response to a call signal from the space sensor. The single actuator may be operable to modulate each of the condenser outlet orifice and the heating outlet orifice between the closed mode and the open mode of that outlet orifice in response to the control signal to satisfy the call signal from the space sensor.

In another aspect, the single valve may be operable by the single actuator to modulate each of the two outlet orifices to enable each of the following modes of operation of the example hydronic system in response to appropriate call signals from the space sensor: a cooling mode, a heating mode, a dehumidification mode, and an idle mode.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2A is a top plan view of the flow control valve of FIG. 1;

FIG. 2B is a side view of the flow control valve of FIG. 1;

FIG. 5A is an isometric view of a main body of the flow control valve of FIG. 1;

FIG. 5B is a top plan view of the main body of the flow control valve of FIG. 1;

FIG. 7A is a flattened top plan view of a portion of the port body of FIG. 6B, the port body being in a first position;

FIG. 7B is a flattened top plan view of the portion of the port body of FIG. 6B, the port body being in a second position;

DETAILED DESCRIPTION

Figure 1:
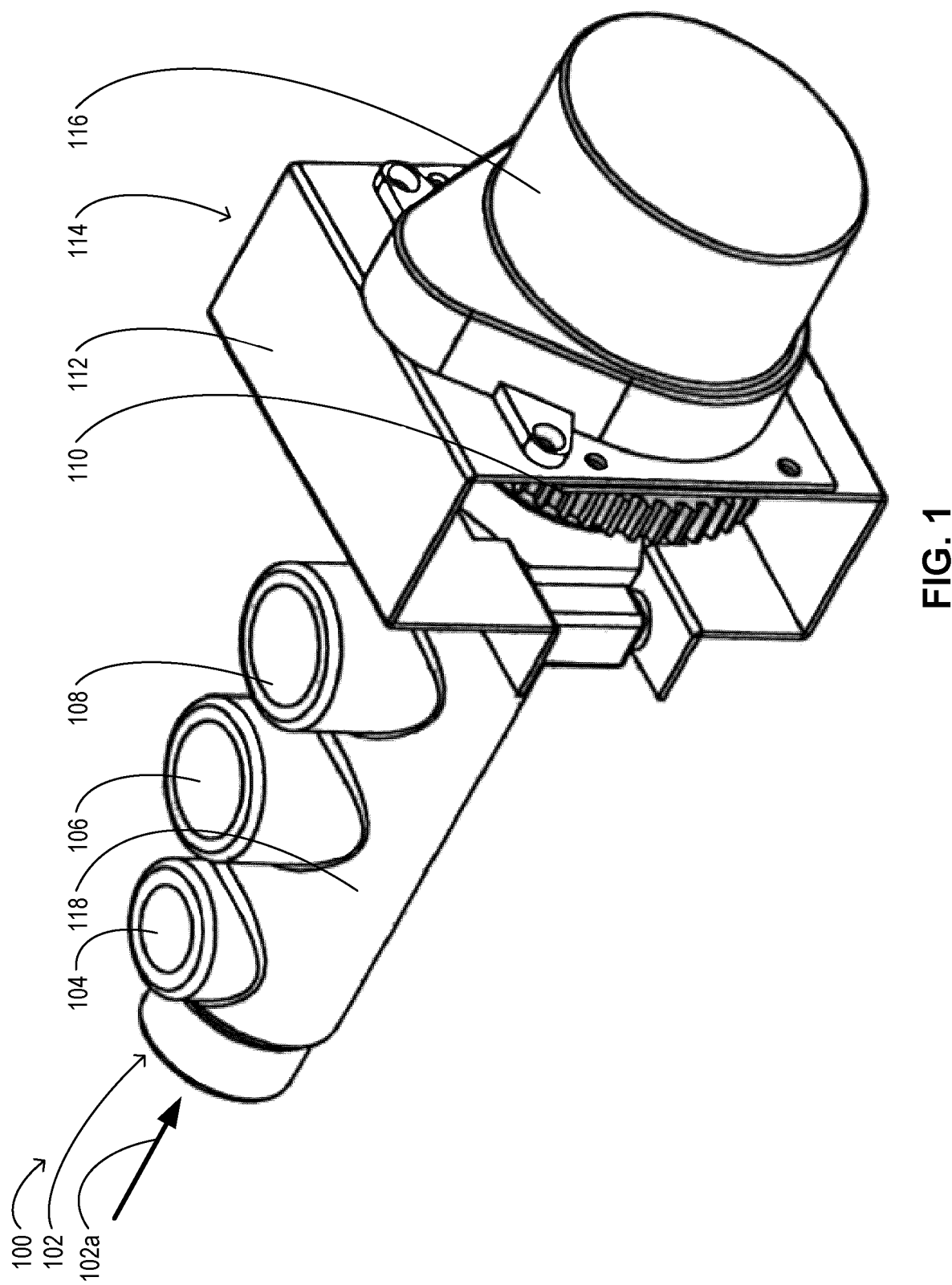
FIG. 1 is an isometric view of a flow control valve, according to one implementation.

According to one aspect of the present technology, there is provided a flow control valve 100 that, in some applications, replaces two flow control valves. In another aspect, the flow control valve 100 of the present technology is operable with a single actuator. Accordingly, in applications in which the flow control valve 100 replaces two flow control valves, the flow control valve 100 replaces two actuators of the two flow control valves with a single actuator. One particular application of the flow control valve of the present technology is in a heat pump, as will be described in more detail herein below.

In this example application, the flow control valve 100 selectively distributes a single fluid supply that it receives via an inlet 102 of the fluid control valve 100 to a condenser 924 and a hydronic reheat coil 914 of the heat pump 900. The fluid control valve 100 modulates fluid flow to each of the condenser 924 and the hydronic reheat coil 914 using a single actuator 114. In this application, the fluid control valve 100 is also operable using the single actuator 114 to selectively stop fluid flow (as will be described in more detail herein below) to one of the condenser 924 and the hydronic reheat coil 914 while modulating flow to the other one of the condenser 924 and the hydronic reheat coil 914.

The flow control valve 100 will now be described in more detail with reference to FIGS. 1 to 8. As shown, the flow control valve 100 includes an inlet 102 connectable to a supply 102a of a fluid, such as a glycol solution, and two outlet orifices 106, 108 for selectively distributing the fluid supply 102a. To this end, each of the two outlet orifices 106, 108 has an open mode in which that outlet orifice 106, 108 is open to fluid flow therethrough, and a closed mode in which that outlet orifice 106, 108 is closed to fluid flow therethrough (subject to possible marginal flow, as described herein below).

In the present implementation, each of the two outlet orifices 106, 108 is modulatable between the closed mode in which that outlet orifice 106, 108 is sealed from the inlet 102, and the open mode in which that outlet orifice 106, 108 is fluidly connected to the inlet 102. For example, FIG. 7A shows the two outlet orifices 106, 108 being in the closed mode. FIG. 7B shows the outlet orifice 108 being in a given position within the open mode, and the outlet orifice 106 being in a given position in the closed mode.

The various aspects of the flow control valve 100 are described below for when the inlet 102 of the flow control valve 100 is connected to the supply 102*a* of the fluid.

Figure 8B:
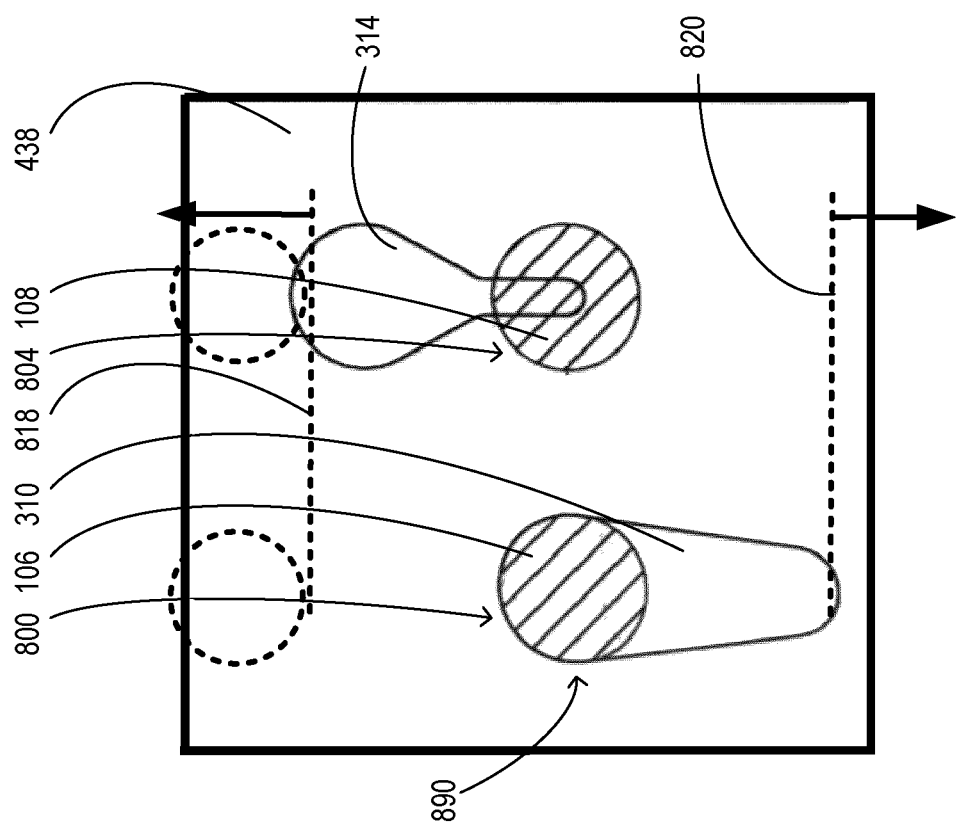
FIG. 8B is a flattened top plan view of the portion of the port body of FIG. 6B, the port body being in a fourth position.
Figure 8A:
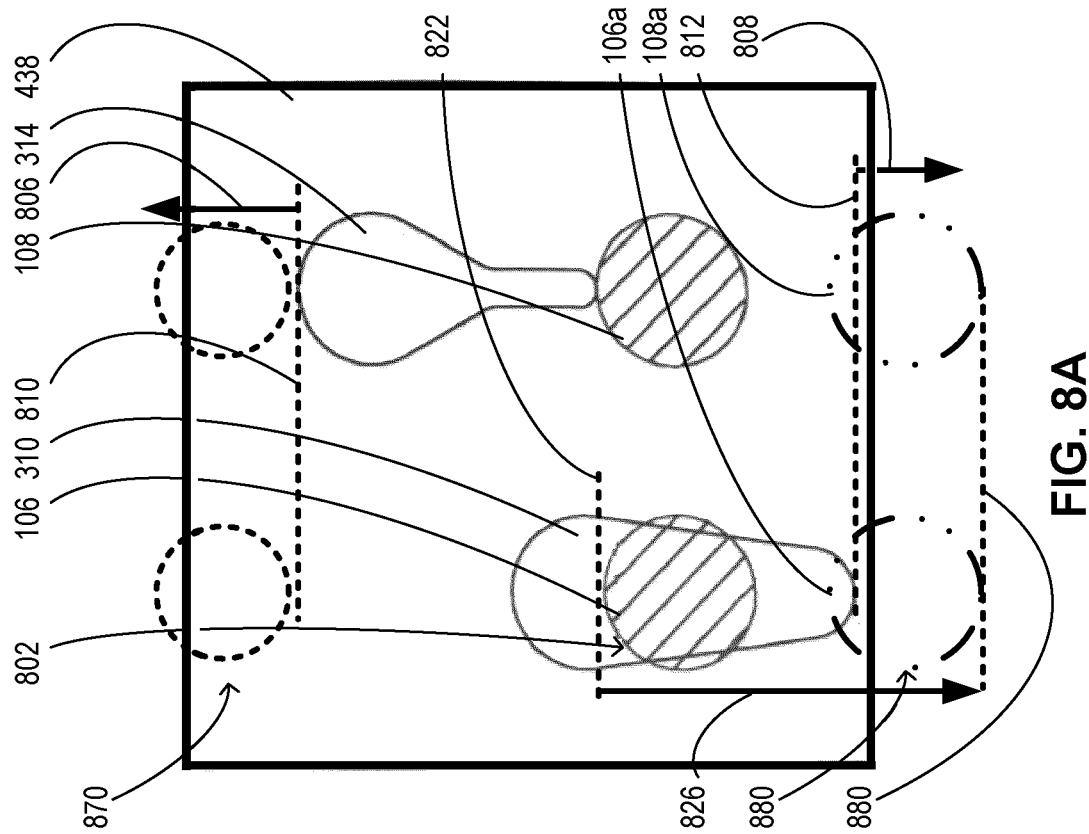
FIG. 8A is a flattened top plan view of the portion of the port body of FIG. 6B, the port body being in a third position.

Reference is now made to FIGS. 7B and 8A-8B. The open mode of each of the outlet orifices 106, 108 includes a most-open position 700, 800 and a partially open position 802, 804. Each of the outlet orifices 106, 108 is modulatable within the open mode to modulate a rate of flow of fluid passing through that outlet orifice 106, 108 in the open mode. As shown by FIGS. 7A and 8B, in the present implementation, each of the two outlet orifices 106, 108 is modulatable between the closed mode and the open mode of that outlet orifice 106, 108 while the other one of the two outlet orifices 106, 108 is in the closed mode.

In the present implementation, in the closed mode of each of the outlet orifices 106, 108, none of the supply 102*a* of the fluid passes through that outlet orifice 106, 108. In the open mode of each of the outlet orifices 106, 108, at least a portion of the supply 102*a* of the fluid passes through that outlet orifice 106, 108. In other words, when an outlet orifice 106, 108 is in the open mode, that outlet orifice 106, 108 is fluidly connected to the inlet 102 of the flow control valve 100.

In some implementations, in the closed mode of each of the two outlet orifices 106, 108, that outlet orifice 106, 108 is substantially sealed from the inlet 102 such that a marginal flow may pass through that outlet orifice 106, 108. Whether or not marginal flow occurs may depend on, for example, fluid pressure differentials across the flow control valve 100 at different times during operation of the flow control valve 100. Marginal flow is a flow rate of fluid through an outlet orifice 106, 108 that is in magnitude less than a predefined percentage of a most-open flow rate of fluid through that outlet orifice 106, 108, the most-open flow rate being a flow rate of the fluid that passes through that outlet orifice 106, 108, at a given set of conditions of the supply 102*a* of the fluid, when that outlet orifice 106, 108 is in the most-open position 700, 800 and when the supply 102*a* of the fluid is connected to the inlet 102.

Figure 3:
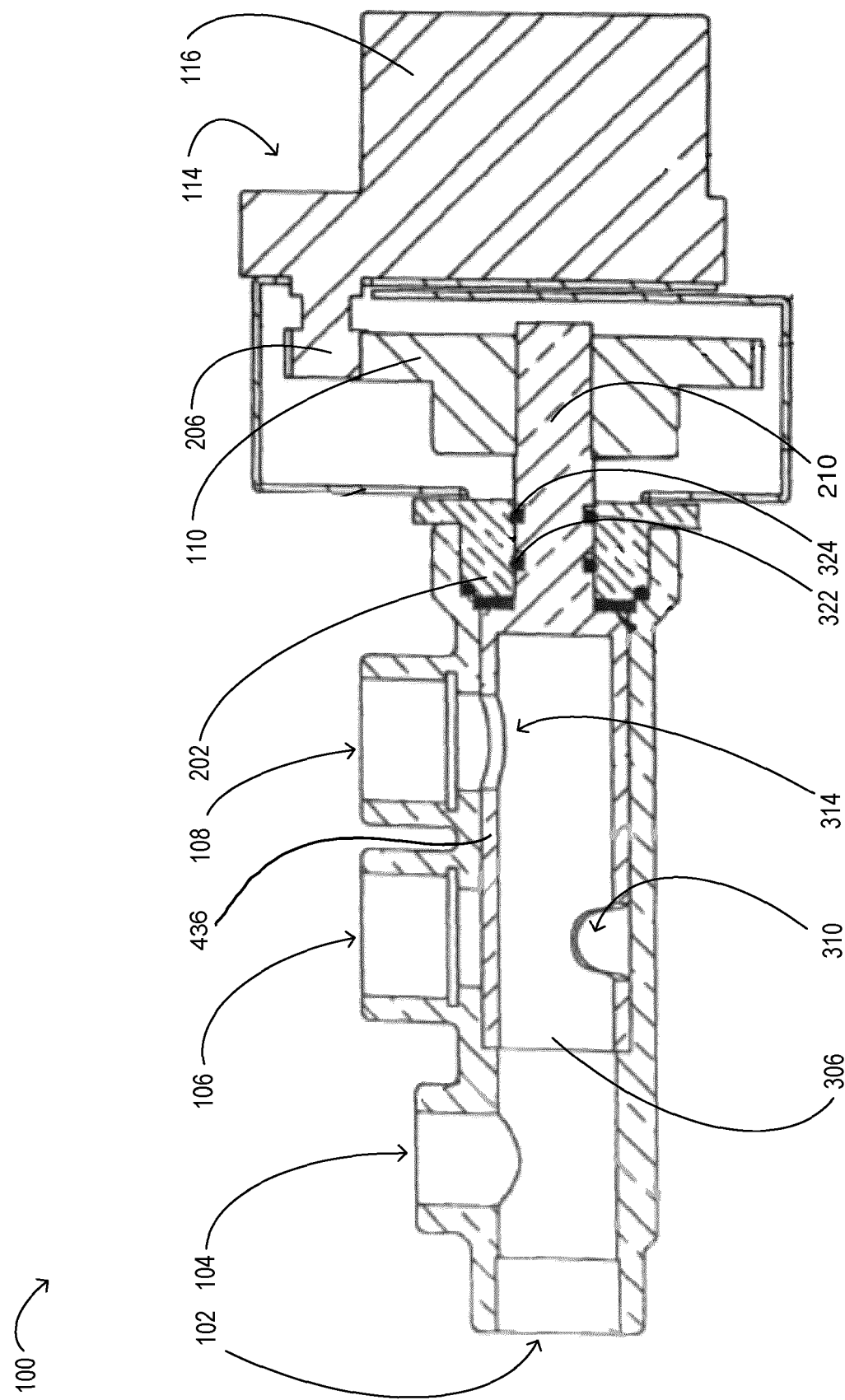
FIG. 3 is a section view of the flow control valve of FIG. 1, taken along section line A-A of FIG. 2A.
Figure 4:
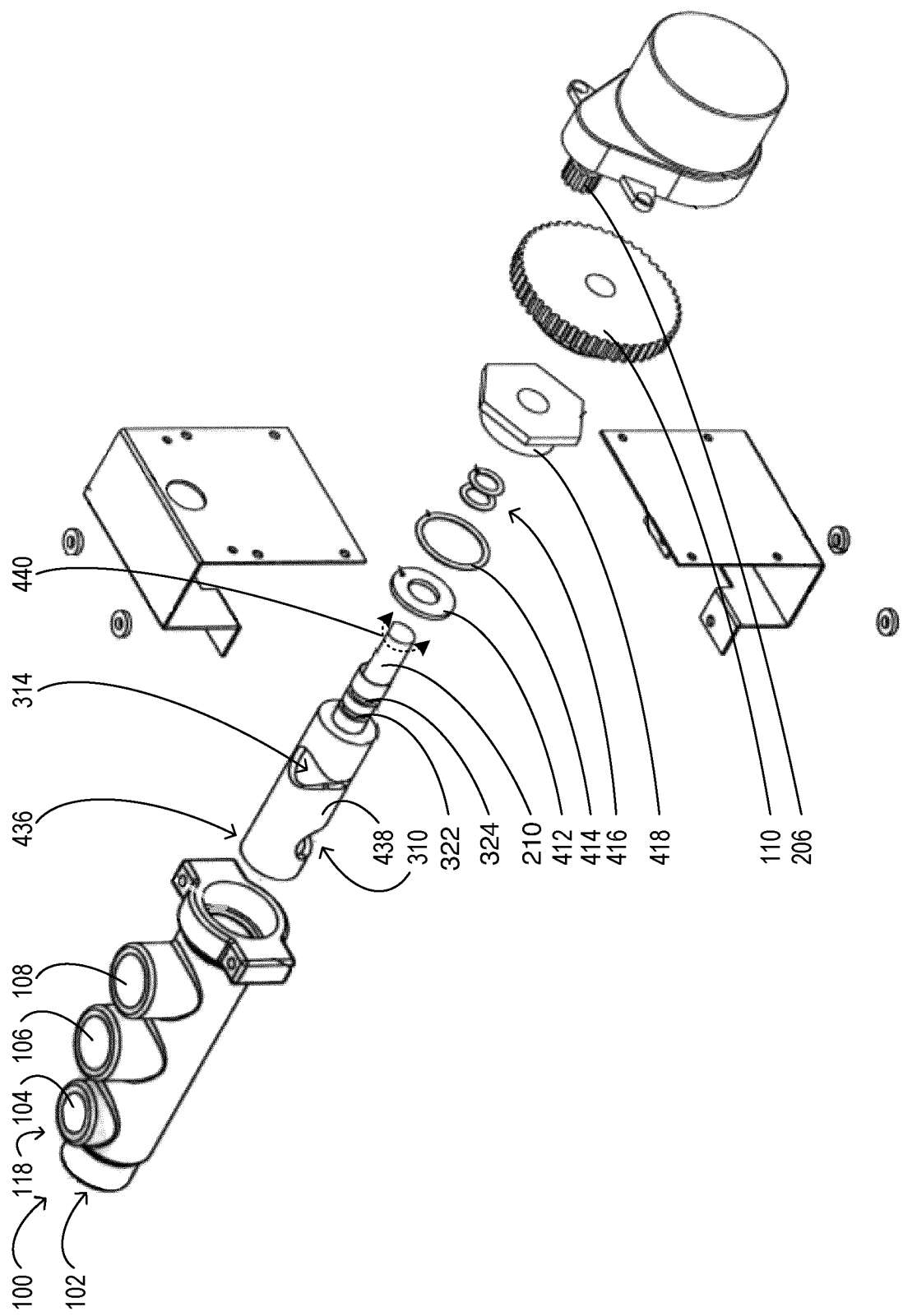
FIG. 4 is an isometric exploded view of the flow control valve of FIG. 1.
Figure 6A:
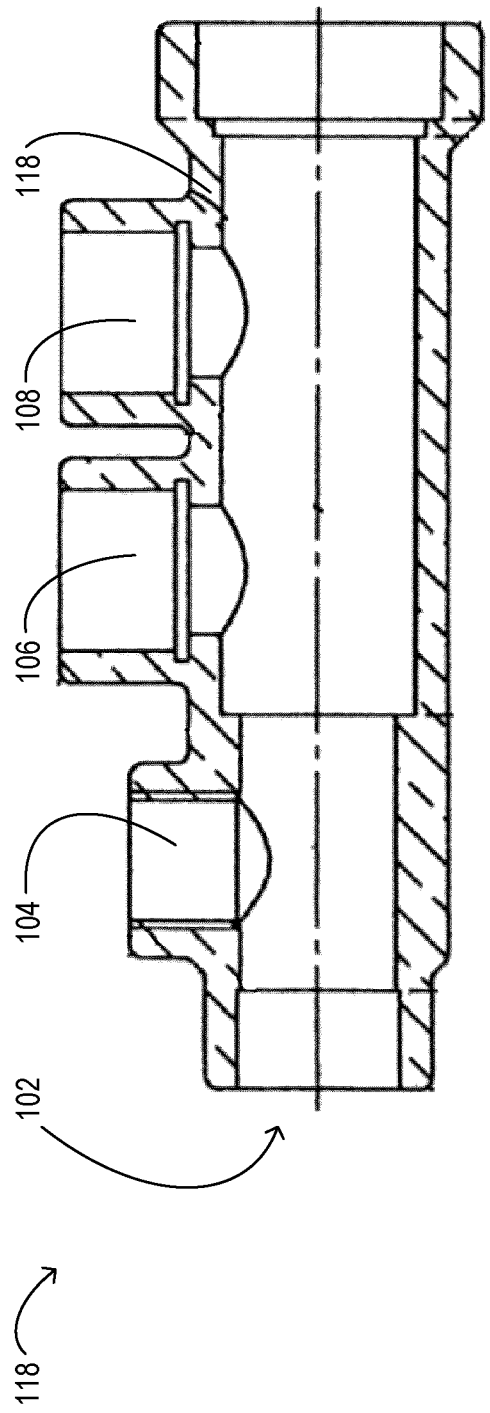
FIG. 6A is a section view of the main body of the flow control valve of FIG. 2A, taken along section line A-A of FIG. 1.
Figure 6B:
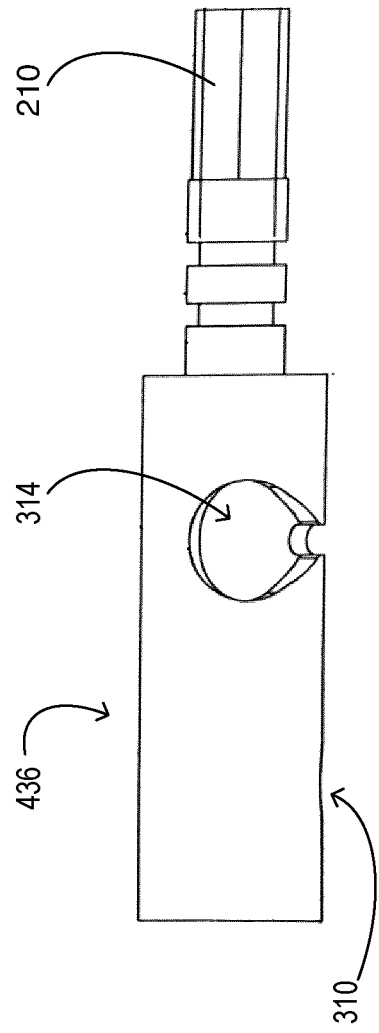
FIG. 6B is a side view of a port body of the flow control valve of FIG. 1.

Reference is now made to FIGS. 3 and 4. In some implementations, each of the outlet orifices 106, 108 is substantially sealed from the inlet 102 when that outlet orifice 106, 108 is in the closed mode, such that in the closed mode, that outlet orifice 106, 108 has a marginal fluid connection to the inlet 102 to provide for the marginal flow. In implementations of the flow control valve 100 in which the flow control valve 100 has a port body 436 with two ports 310, 314, the marginal flow connection of a given outlet orifice 106, 108 is provided by a marginal overlap of that outlet orifice 106, 108 with its corresponding port 310, 314 in the closed mode of that outlet orifice 106, 108. In the present implementation, each of the ports 310, 314 is disposed in the port body 436 such that that port 310, 314 overlaps at least partially with its corresponding one of the two orifices 106, 108 when that orifice 106, 108 is in the open mode and lacks overlap with that orifice 106, 108 when that orifice 106, 108 is in the closed mode.

The predefined percentage may be different for each of the two outlet orifices 106, 108 depending on the particular application of that implementation of the flow control valve 100. For example, where the flow control valve 100 is to be implemented with relatively higher or lower fluid flow rates through the outlet orifices 106, 108, then the predefined percentage may be selected to be relatively lower or higher, respectively, to provide a particular desired magnitude of marginal flow in the closed mode of one or both of the outlet orifices 106, 108. A particular desired magnitude of marginal flow may be selected depending on, for example, the particular system(s) for which that flow control valve 100 may have been selected. For example, in some implementations, the predefined percentage is five percent for each of the two outlet orifices 106, 108.

It will be appreciated that fluid flow rate through a given orifice or conduit having a particular geometry at a given point in time depends on, among other factors, the fluid pressure available to press the fluid through that orifice or conduit. It will be appreciated that the fluid flow conditions and operation of the flow control valve 100 are described in this document in relation to "the supply 102*a* of fluid" being at a design set of fluid pressure and other fluid conditions. The design set of conditions depends on, and in some cases may be selected based on, the particular implementation(s) of the flow control valve(s) 100 as well as on the particular system(s) with which those particular implementation(s) of the flow control valve(s) may be implemented.

The conditions of the supply of the fluid in a system may often change and fluctuate. Accordingly, for the purposes of selection of a particular implementation of the flow control valve 100 for a particular system, the predefined percentage for the marginal flow is selected based on a design set of conditions of the supply of the fluid selected for that system, which design set of conditions is determined using conventionally known engineering principles.

The predefined percentage may be pre-set for a particular implementation of the flow control valve 100 in any suitable way. For example, it may be pre-set by implementing the flow control valve 100 with an actuator 114 having a suitable built-in rotational limiter to pre-set a rotational range within which the actuator 114 will be operable. In implementations of the flow control valve 100 comprising the port body 436, the rotational limiter may be, for example, used to set a rotational range of the actuator 114 so as to provide a marginal overlap for one or both of the outlet orifices 106, 108 with a corresponding one of the ports 310, 314 in the closed mode of that outlet orifice 106, 108. The size of the marginal overlap can be selected to provide a desired magnitude of the marginal flow at a given design set of fluid conditions of the supply 102*a* of the fluid.

The rotational limiter may be any suitable limiter, such as, for example a software-enabled limiter provided by programming a controller that may operate the actuator 114 within a limited rotational range.

In some implementations of the flow control valve 100, the predefined percentage may be adjustable within a range of percentages. In one example, the range may be between zero percent and ten percent. Range adjustment may be provided by, for example, an adjustable rotational limiter, such as the rotational limiter described above.

In the implementation of the flow control valve 100 shown in FIGS. 1 to 9, each of the outlet orifices 106, 108 is modulatable within the open mode of that outlet orifice 106, 108 while the other one of the two outlet orifices 106, 108 is in the open mode of that outlet orifice 106, 108. For example, FIG. 8B shows each of the two outlet orifices 106, 108 being in the open mode.

In another aspect, in the present implementation, the two outlet orifices 106, 108 are modulatable to simultaneously reduce a rate of flow of the fluid passing through each of the two outlet orifices 106, 108 in the open mode of that outlet orifice 106, 108, when the supply 120*a* of the fluid is connected to the inlet 102.

In a further aspect, in the present implementation, the two outlet orifices 106, 108 are also modulatable to simultaneously increase the rate of flow of the fluid passing through each of the two outlet orifices 106, 108 in the open mode of that outlet orifice 106, 108, when the supply 120a of the fluid is connected to the inlet 102.

In the present implementation, the abovementioned functionality is provided as follows.

As shown in FIGS. 1 to 8B, the flow control valve 100 comprises a main body 118 that has the inlet 102 and the two outlet orifices 106, 108 defined therein, and a port body 436 that is pivotably disposed inside the main body 118. The port body 436 has two ports 310, 314 and an aperture 306 defined therein. The aperture 306 is open to the inlet 102 and the two ports 310, 314 are open to the aperture 306. Therefore, the inlet 102 is in fluid communication with the two ports 310, 314.

The port body 436 is cylindrical and movable relative to the main body 118 between a first position 870 and a second position 880. In this particular implementation, the port body 436 is movable relative to the main body 118 by pivoting relative to the main body 118 about a pivot axis, as illustrated by reference numeral 440 in FIG. 4. To this end, the port body 436 has a shaft 210 that is connected to an actuator 114 to be pivotable by the actuator 114 about the pivot axis. It is contemplated that the actuator 114 could instead be operatively connected to the main body 118 to pivot the main body 118 relative to the port body 436. The actuator 114 provides for the modulation functions described in this document.

In the present implementation, the actuator 114 includes a stepper motor 116 and a transmission operatively connecting the motor 116 to the port body 436. In the present implementation, the transmission is a plurality of gears 110, 206 selected based on the particular implementation of the motor 116 to pivot the port body 436 about the pivot axis, as described in this document. It is contemplated that the transmission could be a different transmission. It is also contemplated that the actuator 114 could be a different actuator, such as a pneumatic actuator.

By being operatively connected to the port body 436, the motor 116 is operatively connected to the two outlet orifices 106, 108 to modulate the two outlet orifices 106, 108 between the closed mode and the open mode of each of the two outlet orifices 106, 108. As shown by FIGS. 1 to 3 and 7A to 8B, the motor 116 is operatively connected to the two outlet orifices 106, 108 to modulate each of the two outlet orifices 106, 108 within the open mode of that outlet orifice 106, 108.

In the implementation shown in FIGS. 1 to 9, the motor 116 is operable to pivot the port body 436 in two directions shown by the arrow labelled with reference numeral 440. In the present implementation, the flow control valve 100 comprises only one actuator 114 and the single actuator 114 is operable to provide for the flow modulation functionality of the flow control valve 100 as described in this document.

To this end, in the present implementation, the ports 310, 314 are disposed in a cylinder portion 438 of the port body 436 and the outlet orifices 106, 108 are disposed in the main body 118 such that each of the ports 310, 314 has a corresponding outlet orifice 106, 108. In the present implementation, outlet orifice 106 corresponds to port 310, and outlet orifice 108 corresponds to port 314. Similarly, each outlet orifice 106, 108 has one corresponding port 310, 314. It is contemplated that in other implementations, and depending on the application of the flow control valve 100, at least one of the ports 310, 314 may have more than one corresponding outlet orifice 106, 108. It is also contemplated that in other implementations, one or both of the outlet orifices 106, 108 may have more than one corresponding port 310, 314.

The ports 310, 314 and corresponding outlet orifices 106, 108 are disposed relative to each other and are shaped and sized such that when the port body 436 pivots about the pivot axis in a given direction, the ports 310, 314 and corresponding outlet orifices 106, 108 come in and out of alignment with each other as illustrated by FIGS. 7A to 8B and thereby provide the modulation functionality described in this document.

In the present implementation, the outlet orifices 106, 108 are circular. The port 310 is shaped to have a first length, a wider portion 706a, a narrower portion 704 opposite the wider portion 706a, and a gradual transition between the wider portion 706a and the narrower portion 704. The port 314 has a second length, a wider portion 708a, a narrower portion 708b, and a relatively steeper transition between the wider portion 708a and the narrower portion 708b. In the present implementation, the first length is larger than the second length. Also, the port 310 is circumferentially offset from the port 314. It is contemplated that the shapes, lengths, and circumferential offset of the ports 310, 314 and outlet orifices 106, 108 could be different depending on each particular application of the flow control valve 100.

In the present implementation, modulating an outlet orifice 106, 108 within the open mode, by pivoting the port body 436, changes the size of a fluid connection that exists between that outlet orifice 106, 108 and the inlet 102 in the open mode of that outlet orifice 106, 108 by bringing that outlet orifice 106, 108 in or out of alignment with a corresponding one of the ports 310, 314. Changes in the size of the fluid connection accordingly modulates the flow rate of fluid from the supply 102a of the fluid through that outlet orifice 106, 108.

FIGS. 7A to 8B show particular examples of different relative positions of the ports 310, 314 and the outlet orifices 106, 108. FIG. 7A shows the port body 436 being in the first position 870 and each of the ports 310, 314 being out of alignment with that port's 310, 314 corresponding outlet orifice 106, 108. FIG. 8A shows the port body 436 being in the second position 880, the port 310 having an overlap with its corresponding outlet orifice 106a, and port 314 being out of alignment with its corresponding outlet orifice 108a. In the present implementation, when a port 310, 314 is out of alignment with that port's 310, 314 corresponding outlet orifice 106, 108, that port 310, 314 is sealed from that corresponding outlet orifice 106, 108.

As shown in FIG. 7A, in this implementation when the port body 436 is in the first position 870, each of the two outlet orifices 106, 108 is in the closed mode. As shown in FIG. 8A, the first position 870 of the port body 436 is selected to be in a range of positions of the port body 436 in which the outlet orifices 106, 108 are within a closed mode region 806-808 of the port body 436, one example of which closed mode region 806-808 is approximately shown by lines 810-812. In an aspect, the boundaries of the closed mode region 806-808 may be selected differently depending on the application of the flow control valve 100. For example, as shown by lines 818 and 820, the boundaries may be selected such that at least one of the two outlet orifices 106, 108 marginally overlaps with a corresponding port 310, 314 when the port body 436 is in the first position 870. In another aspect, when the port body 436 is in the second position 880, at least one of the two outlet orifices 106, 108 is in the open mode. Pivoting of the port body 436 between the first position 870 and the second position 880 modulates each of the two outlet orifices 106, 108 between the closed mode and the open mode of that outlet orifice 106, 108. The positioning of the boundaries and of the first and second positions 870, 880 of the port body 436 could be selected to be different, to suit each particular application of the flow control valve 100.

In another aspect, in the present implementation, the port body 436 is movable to a third position 890 that is disposed between the first position 870 and the second position 880. FIG. 8B shows an example of the third position 890. A part of the movement of the port body 436 between the third position 890 and the second position 880 modulates the outlet orifices 106, 108 within the open mode of that outlet orifice 106, 108. That is, the outlet orifices 106, 108 are modulatable in an interim mode in which each of the outlet orifices 106, 108 is in the open mode. FIG. 8B shows the outlet orifices 106, 108 being in the interim mode.

Flow modulation profiles are described in more detail next.

In an aspect, the ports 310, 314 and the outlet orifices 106, 108 are disposed, sized, and shaped relative to each other and relative to the port body 436 and to the main body 118 to provide a predefined flow modulation profile of fluid flow through each of the outlet orifices 106, 108. In the present implementation, each of the predefined flow modulation profiles is a flow rate of the fluid that passes through the outlet orifice(s) 106, 108 having that predefined flow modulation profile as a function of an instantaneous position of the port body 436 relative to the main body 118, the instantaneous position of the port body 436 being between the first position 870 and the second position 880 of the port body 436. The predefined flow modulation profiles of the outlet orifices 106, 108 are selected to suit a particular application of that implementation of the flow control valve 100.

As shown in FIGS. 7A to 8B, port 310 has a first predefined shape 704, described in more detail herein above, that provides a first predefined flow modulation profile of fluid flow through the outlet orifice 106 when the outlet orifice 106 is in the open mode. Port 314 has a second predefined shape 702, described in more detail herein above, that provides a second predefined flow modulation profile of fluid flow through the outlet orifice 108 when the outlet orifice 108 is in the open mode. In this implementation, pivoting of the port body 436, for example as described herein above, relative to the main body 118, modulates the two outlet orifices 106, 108 within the open mode as illustrated by FIGS. 7A to 8B.

In the present implementation, the flow control valve 100 includes a sensor port 104 defined in the main body 118. It is contemplated that the sensor port 104 could be defined in the port body 436. A flow sensor 104a is connected to the sensor port 104 to sense a flow rate of fluid passing through the inlet 102.

In the present implementation, the sensor port 104 is upstream of the two outlet orifices 106, 108. Therefore, the flow sensor 104a senses at least approximate flow rates of fluid flow through each of the two outlet orifices 106, 108 when that outlet orifice 106, 108 is in the open mode while the other of the two outlet orifices 106, 108 is in the closed mode. The term "approximate flow rates" accounts for possible sensing accuracy limitations of each particular model of flow sensor 104a, and for the implementations of the flow control valve 100 in which a marginal flow of the fluid may occur through one or both of the two outlet orifices 106, 108 in the closed mode. Acceptable minimum accuracy requirements for each given implementation of the flow sensor 104a are determined based on each particular application of the flow control valve 100.

Accordingly, when a supply 102a of fluid is connected to the inlet of the flow control valve 100, the actuator 114 can be used to pivot the port body 436 about the pivot axis and to thereby modulate (i.e. control a rate of) flow of fluid through each of the two outlet orifices 106, 108 as described herein above.

In the present implementation, the main body 118 and the port body 436 are made out of brass. As shown in FIGS. 3 and 4, various seals 322, 324, 412, 414, 416, 418 are disposed between the main body 118 and the port body 436 to provide fluid seals to prevent leakage of fluid out of the flow control valve 100. It is contemplated that the main body 118 and the port body 436 could be made out of any other suitable material(s). It is also contemplated that any other suitable sealing methods could be used to prevent leakage of fluid out of the flow control valve 100.

A particular application of the flow control valve 100 is described next. While the single particular application is described, the flow control valve 100 may also be used in other applications, including applications that may fall outside of the field of hydronic systems and air conditioning systems.

Figure 9:
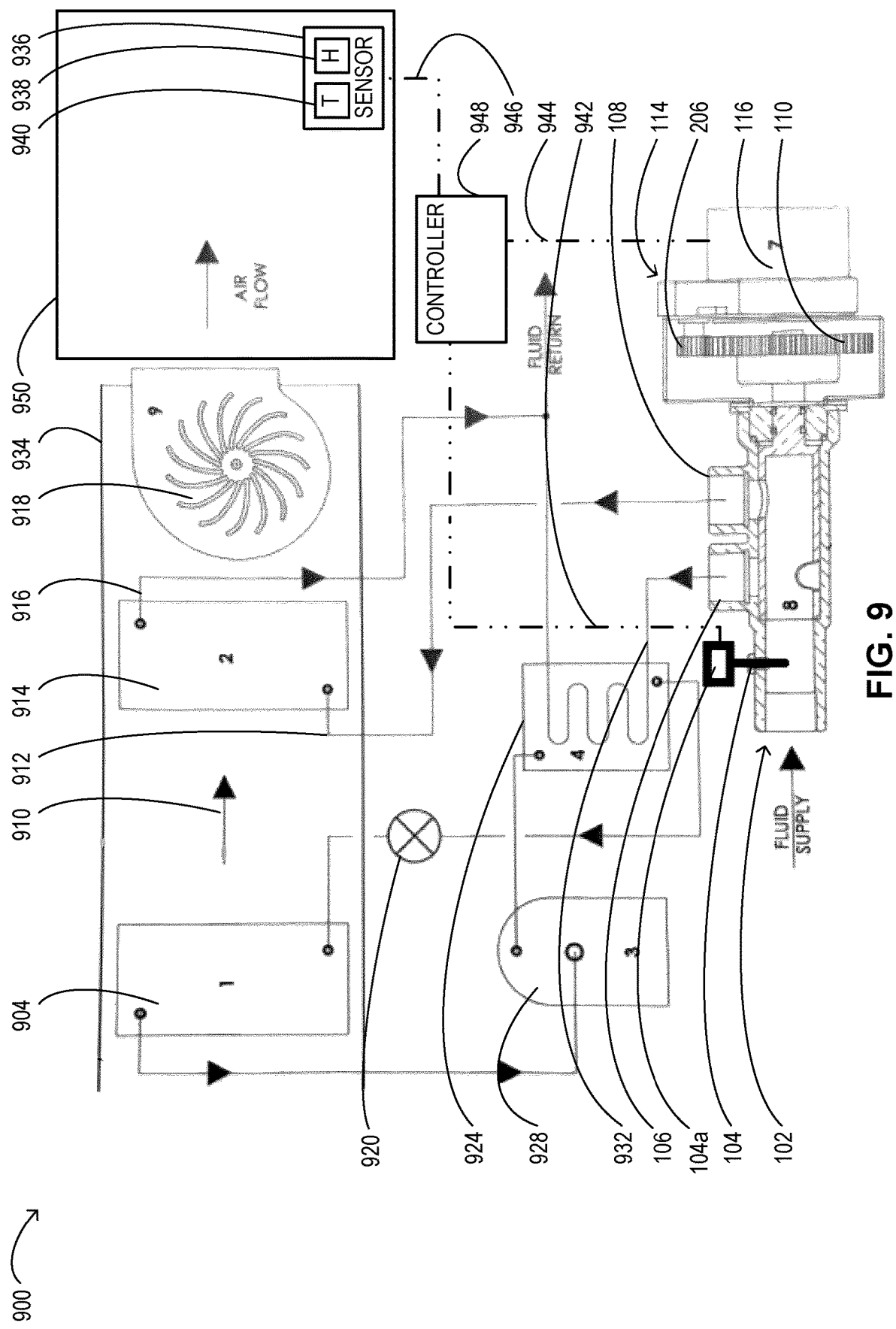
FIG. 9 is a schematic illustration of a hydronic system, the hydronic system including the flow control valve of FIG. 1.

Reference is now made to FIG. 9, which schematically shows a hydronic system 900 that includes the flow control valve 100. The example hydronic system 900 comprises a DX coil 904 and a hydronic coil 914. Each of the coils 904, 914 is disposed in an air stream 910 supplied by the hydronic system 900 to a space 950 served by that hydronic system 900. Typical examples of spaces 950 that may be served by the hydronic system 900 include condominium units, residential homes, other occupied spaces, and mechanical rooms.

As shown, the hydronic system 900 further comprises a condenser 924 operatively connected with the DX coil 904, an expansion valve 920, and a refrigerant compressor 928. The condenser 924 is operable with the DX coil 904, the expansion valve 920, and the refrigerant compressor 928 to cool the air stream 910 from a first temperature at which the air stream enters the DX coil 904, to a second, lower, temperature at which the air stream 910 exits the DX coil 904.

The hydronic coil 914 is operable with the fluid from the supply 102a of fluid passing through the hydronic coil 914, for example via fluid conduits 912 and 916, to heat the air stream 910 from the second temperature at which the air stream 910 enters the heating coil 914 to a third, higher, temperature at which the air stream 910 leaves the heating coil 914.

In this example, the outlet orifice 106 is fluidly connected by fluid conduit 932 to the condenser 924 and will be further referred to as the condenser outlet orifice 106. The outlet orifice 108 is fluidly connected by fluid conduit 912 to the hydronic coil 914 and will be further referred to as the heating outlet orifice 108.

In this example, the hydronic system 900 comprises a controller 948, which is in electronic communication 944 with the motor 116 of the actuator 114 of the flow control valve 100. The motor 116 is operable with the controller 948 to pivot the port body 436 in two directions, as shown by arrow 440 in FIG. 4, to modulate the two outlet orifices 106, 108 and thus modulate flow of fluid through each of the two outlet orifices 106, 108 as described herein above.

The hydronic system 900 also comprises a supply air duct 934. The supply air duct 934 is connected to at least one space 950 to supply the air stream 910 to the at least one space 950. The hydronic system 900 further comprises a supply air fan 918 to induce the air stream 910 through the supply air duct 934 into the at least one space 950. A space sensor 936 is disposed in the at least one space 950. The space sensor 936 comprises a temperature sensor 940 and a humidity sensor 938 and is operable to produce a call signal in response to at least one of: a temperature condition in the at least one space 950, and a humidity condition in the at least one space 950.

The controller 948 is in electronic communication 946 with the space sensor 936. The call signal may be received by the controller 948 and may include: a cooling call, a heating call, a dehumidification call, and an idle call. The controller 948 is operable to drive the motor 116 to pivot the port body 436 to modulate the outlet orifices 106, 108 in response to a call signal received from the space sensor 936. As shown, the controller 948 is also in electronic communication 942 with the flow sensor 104*a* and is operable to receive flow rate readings from the flow sensor 104*a*.

As shown in FIG. 4, the port body 436 has a port surface 438. The controller 948 is operable to modulate the condenser outlet orifice 106 into the open mode and to simultaneously modulate the heating outlet orifice 108 into the closed mode, in response to a cooling call from the space sensor 936. The controller 948 may do this by, for example, pivoting the port body 436 such that the condenser outlet orifice 106 is disposed above and within a cooling call region 826 of the port surface 438, an example of which cooling call region 826 is shown approximately in FIG. 8A by reference lines 822-824. The size and positioning of the cooling call region 826 is selected to suit the particular cooling, heating and dehumidification capacities of the hydronic system 900. That is, for example, the more flow is expected to be required through a given outlet orifice 106, 108 in a given operating mode of the hydronic system 900, the larger the given outlet orifice 106, 108 is made, and vice versa.

The controller 948 is further operable to modulate the condenser outlet orifice 106 within the open mode while maintaining the heating outlet orifice 108 in the closed mode. The controller 948 may do this by, for example, moving the condenser outlet orifice 106 within the cooling call region 826, by appropriately pivoting the port body 436, to decrease or increase overlap of the condenser outlet orifice 106 and its corresponding port 310 and to thereby modulate flow of the fluid through the condenser outlet orifice 106.

The controller 948 receives a flow rate reading from flow sensor 104*a*, compares the flow rate reading to a flow rate setpoint set for the condenser outlet orifice 106 in the cooling mode of operation of the hydronic system 900, and: a) modulates the condenser outlet orifice 106 within the cooling call region 826 to increase the overlap when the flow reading is below the flow rate setpoint, and b) modulates the condenser outlet orifice 106 within the cooling call region 826 to decrease the overlap when the flow reading is above the flow rate setpoint. In the present implementation, the controller 948 is pre-programmed with a suitable proportional-integral-derivative (PID) logic to provide this flow control.

In some applications, this modulation allows the hydronic system 900 to maintain a desired flow rate of fluid from the supply 102*a* of the fluid through the condenser 924 in the cooling mode, to a given level of accuracy, despite, for example, changes in the available pressure of the fluid that may occur at the inlet 102 of the flow control valve 100.

Reference is now made to FIG. 7B. Further in this example, the controller 948 is operable to modulate the heating outlet orifice 108 into the open mode and to simultaneously modulate the condenser outlet orifice 106 into the closed mode, in response to a heating call from the space sensor 936.

The controller 948 may do this by, for example, pivoting the port body 436 such that the heating outlet orifice 108 is disposed above and within a heating call region 708 of the port surface 438. An example a heating call region 708 is shown approximately by reference lines 710-712. The size and positioning of the heating call region 708 is selected to suit each particular implementation and application of the hydronic system 900.

The controller 948 is further operable to modulate the heating outlet orifice 108 within the open mode while maintaining the condenser outlet orifice 106 in the closed mode. The controller 948 may do this by, for example, pivoting the port body 436 to move the heating outlet orifice 108 within the heating call region 708 to decrease or increase overlap of the heating outlet orifice 108 and its corresponding port 314 and to thereby modulate flow of fluid from the supply 102*a* of the fluid through the heating outlet orifice 108.

In the present implementation, the controller 948 compares flow rate readings received from flow sensor 104*a* to a flow rate setpoint set for the heating outlet orifice 108 in that mode of operation of the hydronic system 900, and: a) modulates the heating outlet orifice 108 within the heating call region 708 to increase the overlap when the flow reading is below the flow rate setpoint, and b) modulates the heating outlet orifice 108 within the heating call region 708 to decrease the overlap when the flow reading is above the flow rate setpoint.

In the present implementation, this modulation helps maintain a desired flow rate of fluid through the hydronic coil 914 to a given level of accuracy, despite, for example, changes in the available pressure of the fluid that may occur at the inlet 102 of the flow control valve 100. In another aspect, this modulation allows to vary a rate of heat injected by the hydronic coil 914 into the air stream 910 by regulating the amount of fluid that passes through the hydronic coil 914 in order to suitably satisfy heating calls from the space sensor 936.

Yet further in the implementation shown in FIG. 9, the controller 948 is operable to modulate the two outlet orifices 106, 108 in response to a dehumidification call from the space sensor 936, such that: a) a first flow rate of the fluid from the fluid loop flows through the condenser 924 to provide for the operation of the DX coil 904 to cool the air stream 910 leaving the DX coil 904 to the second temperature to dehumidify the air stream 910, and b) a second flow rate of the fluid from the fluid loop flows through the heating coil 914 to reheat the air stream 910 entering the heating coil 914 to the third temperature, the third temperature being suitable to maintain a desired air temperature setpoint in the space. To do this, the controller 948 pivots the port body 436 to align, and modulate a degree of alignment, of each of the outlet orifices 106, 108 with a corresponding one of the ports 310, 314.

In this implementation example, the hydronic system 900 is a heat pump. More particularly, the hydronic system 900 is a heat pump lacking a (refrigerant flow) reversing valve in the refrigerant circuit. It is contemplated that the hydronic system 900 could include a (refrigerant flow) reversing valve. The example hydronic system 900 may be classified as a hybrid heat pump.

Figure 10:
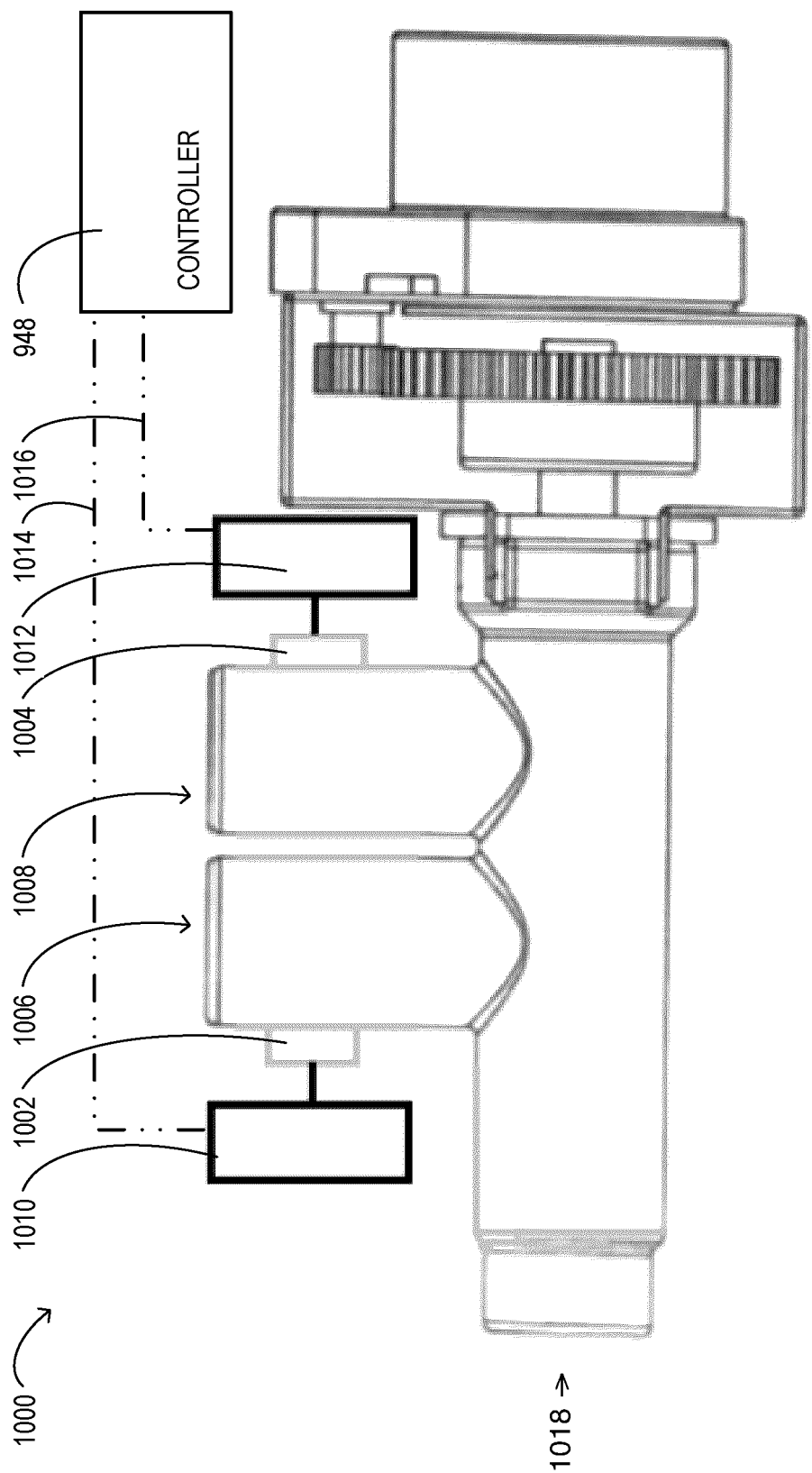
FIG. 10 is a side view of another implementation of the flow control valve of FIG. 1.

Reference is now made to FIG. 10, which shows an alternative implementation of the flow control valve 1000. In this implementation, the flow control valve 1000 has two outlet orifices 1006, 1008 and each of the two outlet orifices 1006, 1008 comprises a sensor port 1002, 1004 connected with a dedicated flow sensor 1010, 1012 to sense a flow rate of the fluid through each of the two outlet orifices 1006, 1008.

In one aspect, when such an implementation of the flow control valve 1000 is implemented with the example hydronic system 900, the controller 948 is in electronic communication 1014, 1016 with each of the dedicated flow sensors 1010, 1012 and receives flow rate readings from each of the dedicated flow sensors 1010, 1012 for each of the outlet orifices 1006, 1008, respectively. As shown, each of the dedicated sensors 1010, 1012 is connected, in this example by wiring 1014, 1016. In other examples, the electronic communication connections may be established by any suitable means of communication, such as wireless connectivity components.

The controller 948 modulates the outlet orifices 1006, 1008 in each of the cooling, heating, dehumidification, and idle modes of operation of the example hydronic system 900 (as described above) by comparing the flow rate readings with flow rate setpoints for each outlet orifice 1006, 1008 in each mode of operation, respectively. More particularly, the controller 948 modulates the outlet orifices 1006, 1008 to maintain flowrates through the outlet orifices 1006, 1008 that approach the setpoints, respectively. Proportional-Integral-Derivative control is used, but other control types are also contemplated.

In some applications, advantages are achieved when implementations of the flow control valve 100, 1000 that have marginal flow through at least one of the outlet orifices 106, 108, 1006, 1008 in the closed mode of that outlet orifice 106, 108, 1006, 1008 are implemented with a system such as the example hydronic system 900 described above.

For example, the heating outlet orifice 108, 1008 of the flow control valve 100, 1000 implemented with example hydronic system 900 may have a marginal flow in the closed mode that is, in magnitude, equal to two percent of a most-open flow rate of the fluid through that outlet orifice 108, 1008. In one aspect, this marginal flow may keep conduits 912 and 916 and other elements that may be connected to that outlet orifice 108, 1008 such as the hydronic coil 914, wet with the fluid from the supply 102a of the fluid even when such elements are not in use for extended periods of time.

The fluid may contain chemicals, such as rust protection chemicals. Continuous contact of elements with such chemicals may reduce the rates at which rust may otherwise affect such elements.

In another aspect, where a plurality of the example hydronic systems 900 is implemented in a larger system for serving, for example, a commercial building, the marginal flow of the heating outlet orifice 108, 1008 of each of the flow control valves 100, 1000 may allow installers of the larger system to fill at least a part of the larger system with the fluid once the supply 102a of the fluid has been connected to each of the flow control valves 100, without having to operate the example hydronic systems 900 in order to modulate the heating outlet orifices 108, 1008 into the open mode.

This may allow the installers to avoid a wait time that may otherwise be required between the completion of connections of the supplies 102a of the fluid to the example hydronic systems 900 and the completion of electrical connections to the example hydronic systems 900.

In this respect, a method of minimizing an installation time of a larger system comprising a plurality of hydronic systems 900 each of which has the flow control valve 100 is provided. In one aspect, the method includes providing the plurality of hydronic systems 900 each of which has the flow control valve 100, wherein each of the flow control valves 100, 1000 is pre-set into the open mode to permit installers to do at least one of: flush, and fill the larger system by connecting a supply of a fluid to each of the flow control valves 100, 1000 and without operating the flow control valves 100, 1000.

In another aspect, the method includes providing the plurality of the flow control valves 100, 1000, wherein each of the outlet orifices 106, 108, 1006, 1008 of each of the flow control valves 100, 1000 has a marginal flow in the closed mode of that outlet orifice 106, 108, 1006, 1008.

In yet another aspect, the method further includes providing the plurality of the flow control valves 100, 1000, wherein each of the flow control valves 100 has a combination of at least a few of the features of the flow control valve 100, 1000 described in this document.

Additional aspects of possible implementations of the flow control valve 100, 1000 are described next.

The flow control valve 100, 1000 described in this document may have other applications and is not limited to the applications described in this document. For example, in some applications, the flow control valve 100, 1000 is operable with the fluid flows reversed through the flow control valve 100, 1000 (i.e. reversed relative to the flow directions that were described with respect to the examples and implementations that appeared earlier in this document).

Thus, in an aspect, the flow control valve 100, 1000 comprises three orifices 102, 106, 108, 1018, 1006, 1008. Each of the three orifices 102, 106, 108, 1018, 1006, 1008 is connectable to a fluid conduit (for example, pipes shown with reference numerals 932, 912), respectively (that is, each of the orifices 106, 108 may have a fluid conduit connected to it). Two orifices 106, 108, 1006, 1008 of the three orifices 102, 106, 108, 1018, 1006, 1008 are each modulatable: a) between a closed mode in which that orifice 106, 108, 1006, 1008 is substantially closed to allow substantially no fluid therethrough, and an open mode in which that orifice 106, 108, 1006, 1008 is open, and b) between the closed mode and the open mode while the other one of the two orifices 106, 108, 1006, 1008 is in the closed mode.

In a further aspect, the flow control valve 100, 1000 may be implemented in a system such that at least one of the two orifices 106, 108 may act as (i.e. operate as) a fluid inlet. In some implementations, each of the two orifices 106, 108 may act as (i.e. may be connected so as to operate as) a fluid inlet. In a further aspect, and similar to the implementations described above, the open mode of each of the two orifices 106, 108 may include a most-open position of that orifice 106, 108 and a partially open position of that orifice 106, 108.

Likewise, each of the two orifices 106, 108 may be modulatable within the open mode of that orifice 106, 108 while the other one of the two orifices 106, 108 is also in the open mode of that orifice 106, 108. In a further aspect, each of the two orifices 106, 108 has an effective diameter. The term "effective diameter" is used here to describe, a hypothetical opening that would pass a given flow rate of a fluid at a given pressure drop across that hypothetical opening, which given flow rate would in magnitude be equal to the flow rate of the same fluid that would pass through an orifice 106, 108 of the flow control valve 100, 1000 when that orifice 106, 108 has that effective diameter and the same given pressure drop across that orifice 106, 108.

For example, the effective diameter of each of orifices 106 and 108 shown in FIG. 7A is zero (since there is no overlap between each of the orifices 106, 108 and that orifice's 106, 108 corresponding port 310, 314), and each of these orifices is in the closed mode of that orifice 106, 108. When each of these orifices 106, 108 is modulated into the open mode of that orifice 106, 108, as shown in FIG. 8B, each of these orifices 106, 108 has an effective diameter that is greater than zero (since there is an overlap between each of the orifices 106, 108 and that orifice's 106, 108 corresponding port 310, 314).

In the state shown in FIG. 8B, orifice 106 has a larger effective diameter than orifice 108 and would pass a larger flow rate of a fluid, from a fluid given supply having a given available pressure of the fluid, than would pass orifice 108 from that same given fluid supply.

Thus, in the implementations shown in the figures, orifices 106 and 108 are modulatable to simultaneously decrease the effective diameter of each of the two orifices 106, 108. In a further aspect, the two orifices 106, 108 are also modulatable to simultaneously increase the effective diameter of each of the two orifices 106, 108. In yet a further aspect, the orifices shown by reference numerals 102 and 1018 also have an effective diameter and are modulatable to increase or decrease that effective diameter.

In yet another aspect, depending on how the flow control valve 100, 1000 is connected in a given system, fluid may flow through the flow control valve 100, 1000 in either direction through a given flow path that may form across the flow control valve 100, 1000 in a given operational mode of the flow control valve 100, 1000 and through a given effective diameter of a given orifice 102, 1018, 106, 108, 1006, 1008.

For example, depending on how the flow control valve 100, 1000 is connected in a system, the orifices 102 and 1018 may operate as an outlet for a fluid at least in some modes of operation of the flow control valve 100, 1000. In such instances, orifice 102, 1018 may be described as being operable between an open mode in which that orifice 102, 1018 has an effective diameter that is greater than zero and can pass a fluid, and a closed mode in which that orifice 102, 1018 has an effective diameter that is substantially zero and can pass substantially no fluid.

Implementations of the present technology can be represented as presented in the following numbered clauses.

CLAUSE 1. A flow control valve, comprising: a main body, an inlet defined in the main body, the inlet being connectable to a supply of a fluid; and at least two outlet orifices defined in the main body, each outlet orifice of the at least two outlet orifices being modulatable: between a closed mode in which that outlet orifice is substantially sealed from the inlet, and an open mode in which that outlet orifice is fluidly connected to the inlet, and between the closed mode and the open mode while another one of the at least two outlet orifices is in the closed mode.

CLAUSE 2. The flow control valve of clause 1, wherein when the inlet is connected to the supply of the fluid: a) in the closed mode of each outlet orifice of the at least two outlet orifices, substantially none of the supply of the fluid passes through that outlet orifice; and b) in the open mode of each outlet orifice of the at least two outlet orifices, at least a portion of the supply of the fluid passes through that outlet orifice.

CLAUSE 3. The flow control valve of clause 1, wherein the open mode of each of the outlet orifices includes a most-open position of that outlet orifice and a partially open position of that outlet orifice.

CLAUSE 4. The flow control valve of clause 1 or 3, wherein in the closed mode of at least one of the at least two outlet orifices, that outlet orifice is substantially sealed from the inlet such that a marginal flow passes through that outlet orifice in the closed mode, the marginal flow being in magnitude less than a predefined percentage of a most-open flow rate through that outlet orifice, the most-open flow rate being a flow rate of the fluid that passes through that outlet orifice when that outlet orifice is in the most-open position and when the supply of the fluid is connected to that outlet orifice.

CLAUSE 5. The flow control valve of clause 4, wherein the predefined percentage is adjustable within a range of percentages.

CLAUSE 6. The flow control valve of any one of clauses 4 and 5, wherein the predefined percentage is five percent.

CLAUSE 7. The flow control valve of any one of clauses 4 to 6, wherein the range is between zero percent and ten percent.

CLAUSE 8. The flow control valve of any one of clauses 1 to 7, wherein each outlet orifice of the at least two outlet orifices is modulatable within the open mode of that outlet orifice to modulate a rate of flow of the fluid that passes through that outlet orifice in the open mode of that outlet orifice when the inlet is connected to the supply of the fluid.

CLAUSE 9. The flow control valve of any one of clauses 1 to 8, wherein each outlet orifice of the at least two outlet orifices is modulatable within the open mode of that outlet orifice while another one of the at least two outlet orifices is in the open mode of that outlet orifice.

CLAUSE 10. The flow control valve of any one of clauses 1 to 9, wherein the at least two outlet orifices are modulatable to simultaneously reduce the portion of the supply of the fluid that passes through each of the at least two outlet orifices in the open mode of that outlet orifice when the inlet is connected to the supply of the fluid.

CLAUSE 11. The flow control valve of any one of clauses 1 to 10, wherein the at least two outlet orifices are modulatable to simultaneously increase the portion of the supply of the fluid that passes through each of the at least two outlet orifices in the open mode of that outlet orifice when the inlet is connected to the supply of the fluid.

CLAUSE 12. The flow control valve of any one of clauses 1 to 11, comprising an actuator operatively connected to the at least two outlet orifices to modulate the at least two outlet orifices between the closed mode and the open mode of each of the at least two outlet orifices.

CLAUSE 13. The flow control valve of clause 12, wherein the actuator is operatively connected to the at least two outlet orifices to modulate each of the at least two outlet orifices within the open mode of that outlet orifice.

CLAUSE 14. The flow control valve of any one of clauses 1 to 13, further comprising a port body pivotably disposed in the main body, the port body having at least two ports and being pivotable relative to the main body between a first position and a second position, and the inlet being in fluid communication with the at least two ports, wherein: a) when the port body is in the first position, each of the at least two outlet orifices is in the closed mode; b) when the port body is in the second position, at least one of the at least two outlet orifices is in the open mode; and c) pivoting of the port body between the first position and the second position modulates at least one of the at least two outlet orifices between the closed mode and the open mode of that outlet orifice.

CLAUSE 15. The flow control valve of clause 14, wherein the port body is movable to a third position that is between the first position and the second position, and at least part of movement of the port body between the third position and the second position modulates each of the at least two outlet orifices within the open mode.

CLAUSE 16. The flow control valve of clause 15, wherein: a) when the port body is in the first position, each of the at least two ports is substantially out of alignment with a corresponding outlet orifice of the at least two outlet orifices; and b) when the port body is in the second position, a first port of the at least two ports has an overlap with the corresponding outlet orifice.

CLAUSE 17. The flow control valve of clause 16, wherein the first port has a first predefined shape that provides a first predefined flow modulation profile of the portion of the supply of the fluid that passes through the first port's corresponding outlet orifice in the open mode of that outlet orifice when the inlet is connected to the supply of the fluid.

CLAUSE 18. The flow control valve of clause 17, wherein a second port of the at least two ports has a second predefined shape that provides a second predefined flow modulation profile of the portion of the supply of the fluid that passes through the second port's corresponding outlet orifice in the open mode of that outlet orifice when the inlet is connected to the supply of the fluid.

CLAUSE 19. The flow control valve of any one of clause 18, wherein each of the first and second predefined flow modulation profiles is a flow rate of the fluid that passes through the port having that predefined flow modulation profile as a function of a position of the port body relative to the main body, the position of the port body being between the first position and the second position of the port body.

CLAUSE 20. The flow control valve of any one of clauses 14 to 19, wherein movement of one of the main body and the port body relative to the other one of the main body and the port body during at least a part of this movement modulates at least one of the two outlet orifices within the open mode of that outlet orifice.

CLAUSE 21. The flow control valve of any one of clauses 14 to 20, wherein at least one of the main body and the port body comprises a sensor port connectable with a flow sensor to sense a flow rate of the fluid through the inlet.

CLAUSE 22. The flow control valve of any one of clauses 14 to 20, wherein each of the at least two outlet orifices comprises a sensor port connectable with a dedicated flow sensor to sense a flow rate of the fluid through each of the at least two outlet orifices.

CLAUSE 23. A hydronic system comprising the flow control valve of clause 21, wherein: the hydronic system has: a direct expansion coil operable with a condenser to cool an incoming airstream, a hydronic coil operable to heat the incoming airstream, a controller, and the flow sensor, the flow sensor being connected to the sensor port and being in electronic communication with the controller; a condenser outlet orifice of the at least two outlet orifices is fluidly connected to the condenser; a heating outlet orifice of the at least two outlet orifices is fluidly connected to the hydronic coil; the actuator is in electronic communication with the controller; the controller is operable, in response to a call signal from a space sensor, with the flow sensor to produce a control signal; and the actuator is operable to modulate each of the condenser outlet orifice and the heating outlet orifice between the closed mode and the open mode of that outlet orifice in response to the control signal. CLAUSE 24. The hydronic system of clause 23, wherein the controller is operable to produce the control signal, in response to a dehumidification call signal from the space sensor, to operate the actuator to modulate: a) the condenser outlet orifice to the open mode and to operate the direct expansion coil to cool the incoming airstream to a first temperature, and b) the heating outlet orifice to the open mode and to operate the hydronic coil to reheat the incoming airstream to a second temperature.

CLAUSE 25. The hydronic system of clause 23 or 24, wherein the hydronic system is a hydronic apparatus.

CLAUSE 26. The hydronic system of clause 23 or 24, wherein the hydronic system is a heat pump.

CLAUSE 27. A flow control valve, comprising a main body, and three orifices defined in the main body, each of the three orifices being connectable to a fluid conduit, and each of two orifices of the three orifices being modulatable: between a closed mode in which that orifice is substantially closed, and an open mode in which that orifice is open, and between the closed mode and the open mode while the other one of the two orifices is in the closed mode.

CLAUSE 28. The flow control valve of clause 27, wherein at least one of the two orifices is a fluid inlet.

CLAUSE 29. The flow control valve of clause 27, wherein each of the two orifices is a fluid inlet.

CLAUSE 30. The flow control valve of any one of clauses 27 to 29, wherein the open mode of each of the two orifices includes a most-open position of that orifice and a partially open position of that orifice.

CLAUSE 31. The flow control valve of any one of clauses 27 to 30, wherein each of the two orifices is modulatable within the open mode of that orifice while the other one of the two orifices is in the open mode of that orifice.

CLAUSE 32. The flow control valve of clause 31, wherein each of the two orifices has an effective diameter, and the two orifices are modulatable to simultaneously decrease the effective diameter of each of the two orifices.

CLAUSE 33. The flow control valve of clause 32, wherein the two orifices are modulatable to simultaneously increase the effective diameter of each of the two orifices.

CLAUSE 34. The flow control valve of clause 33, wherein: a) the flow control valve has a port body having two ports, each port being disposed in the port body relative to the orifices such that it overlaps at least partially with one of the two orifices when that orifice is in the open mode and substantially lacks overlap with that orifice when that orifice is in the closed mode; and b) one of the port body and the main body is disposed over and rotationally connected to the other one of the port body and the main body such that pivoting one of the port body and the main body relative to the other one of the port body and the main body modulates each of the two orifices between the open mode and the closed mode of that orifice.

CLAUSE 35. The flow control valve of clause 34, wherein the two orifices are modulatable between the open mode and the closed mode of that orifice by a single actuator operatively connected to the two orifices.

CLAUSE 36. The flow control valve of clause 35, wherein the single actuator is operatively connected to one of the port body and the main body to pivot that one of the port body and the main body relative to the other one of the port body and the main body.

The various implementations and applications of the flow control valves 100, 1000, the example hydronic system 900, and the methods described in this document may be implemented using any suitable combination of known manufacturing, assembly, wiring, and programming methods, as applicable to each particular implementation of the flow control valves 100, 1000.

While particular examples are described above, it will be appreciated that other implementations, applications, and methods may be within the scope of the disclosure, clauses and claims included in this document.

The invention claimed is:

1. A flow control valve, comprising:
a main body,
an inlet defined in the main body, the inlet being connectable to a supply of a fluid;
a first outlet orifice defined in the main body, the first outlet orifice being modulatable between:
a closed mode of the first outlet orifice in which the first outlet orifice is substantially sealed from the inlet, and
an open mode of the first outlet orifice in which the first outlet orifice is fluidly connected to the inlet;
a second outlet orifice defined in the main body, the second outlet orifice being distinct from the first outlet orifice and being modulatable between:
a closed mode of the second outlet orifice in which the second outlet orifice is substantially sealed from the inlet, and
an open mode of the second outlet orifice in which the second outlet orifice is fluidly connected to the inlet; and
a port body disposed in the main body and being pivotable relative to the main body about a pivot axis, the port body having a first port and a second port defined in the port body, the second port being distinct from the first port, the first port and the second port being fluidly connected to the inlet of the main body, the port body being pivotable relative to the main body about the pivot axis between a first position and a second position, the first port selectively fluidly connecting the first outlet orifice to the inlet, the first port being substantially out of alignment with the first outlet orifice when the port body is in the first position and thereby defining the closed mode of the first outlet orifice, the second port selectively fluidly connecting the second outlet orifice to the inlet, the second port being substantially out of alignment with the second outlet orifice when the port body is in the first position and thereby defining the closed mode of the second outlet orifice,
the first port and the second port being disposed, sized, and shaped relative to each other in the port body such that the port body is pivotable about the pivot axis:
within a first range of positions of the port body about the pivot axis to modulate the first outlet orifice between the closed mode and the open mode of the first outlet orifice while the second outlet orifice is in the closed mode of the second outlet orifice; and
within a second range of positions of the port body about the pivot axis to modulate the second outlet orifice between the closed mode and the open mode of the second outlet orifice while the first outlet orifice is in the closed mode of the first outlet orifice.

2. The flow control valve of claim 1, wherein when the inlet is connected to the supply of the fluid:
in the closed mode of the first outlet orifice, substantially none of the fluid passes from the inlet through the first outlet orifice;
in the closed mode of the second outlet orifice, substantially none of the fluid passes from the inlet through the second outlet orifice;
in the open mode of the first outlet orifice, at least a portion of the fluid passes from the inlet through the first outlet orifice; and
in the open mode of the second outlet orifice, at least a portion of the fluid passes from the inlet through the second outlet orifice.

3. The flow control valve of claim 1, wherein:
the open mode of the first outlet orifice includes a most-open position of the first outlet orifice and a partially open position of the first outlet orifice; and
the open mode of the second outlet orifice includes a most-open position of the second outlet orifice and a partially open position of the second outlet orifice.

4. The flow control valve of claim 3, wherein:
in the closed mode of the first outlet orifice, the first outlet orifice is substantially sealed from the inlet; and
in the closed mode of the second outlet orifice, the second outlet orifice is substantially sealed from the inlet.

5. The flow control valve claim 1, wherein:
the first outlet orifice is modulatable within the open mode of the first outlet orifice to modulate a rate of flow of the fluid that passes through the first outlet orifice in the open mode of the first outlet orifice when the inlet is connected to the supply of the fluid; and
the second outlet orifice is modulatable within the open mode of the second outlet orifice to modulate a rate of flow of the fluid that passes through the second outlet orifice in the open mode of the second outlet orifice when the inlet is connected to the supply of the fluid.

6. The flow control valve of claim 5, wherein:
the first outlet orifice is modulatable within the open mode of the first outlet orifice while the second outlet orifice is in the open mode of the second outlet orifice; and
the second outlet orifice is modulatable within the open mode of the second outlet orifice while the first outlet orifice is in the open mode of the first outlet orifice.

7. The flow control valve of claim 6, wherein the first outlet orifice and the second outlet orifice are modulatable to simultaneously reduce flow rates of the fluid that pass through each of the first outlet orifice and the second outlet orifice in the open mode of the first outlet orifice and the second outlet orifice when the inlet is connected to the supply of the fluid.

8. The flow control valve of claim 7, wherein the first outlet orifice and the second outlet orifice are modulatable to simultaneously increase the flow rates of the fluid that passes through each of the first outlet orifice and the second outlet orifice in the open mode of the first outlet orifice and the second outlet orifice when the inlet is connected to the supply of the fluid.

9. The flow control valve of claim 8, further comprising an actuator connected to the port body, the actuator being operable to pivot the port body about the pivot axis to modulate the first outlet orifice and the second outlet orifice between the closed mode and the open mode of each of the first outlet orifice and the second outlet orifice.

10. The flow control valve of claim 9, wherein the actuator is operable to pivot the port body about the pivot axis to modulate each of the first outlet orifice and the second outlet orifice within the open mode of the first outlet orifice and the second outlet orifice.

11. The flow control valve of claim 10, wherein:

a) when the port body is in the second position, the second outlet orifice is in the open mode of the second outlet orifice; and b) pivoting of the port body from the second position to the first position in a first direction about the pivot axis modulates the second outlet orifice from the open mode of the second outlet orifice to the closed mode of the second outlet orifice.

12. The flow control valve of claim 11, wherein the port body is pivotable about the pivot axis to a third position that is between the first position and the second position, and at least part of pivoting of the port body between the third position and the second position modulates the first outlet orifice within the open mode of the first outlet orifice and the second outlet orifice within the open mode of the second outlet orifice.

13. The flow control valve of claim 12, wherein when the port body is in the second position, the second port has an overlap with the second outlet orifice;

wherein the first port has a first predefined shape that provides a first predefined flow modulation profile through the first outlet orifice as a function of an angular position of the port body about the pivot axis relative to the main body;

wherein the second port has a second predefined shape that provides a second predefined flow modulation profile through the second outlet orifice as a function of the angular position of the port body about the pivot axis relative to the main body; and wherein the first predefined flow modulation profile and the second predefined flow modulation profile are such that pivoting of the port body from the first position to the second position in a second direction about the pivot axis, the second direction being opposite the first direction, brings the first port and the second port in and out of alignment with corresponding ones of the first outlet orifice and second outlet orifice to:

modulate the first outlet orifice from the closed mode of the first outlet orifice into the open mode of the first outlet orifice while the second outlet orifice is in the closed mode of the second outlet orifice, then modulate the second outlet orifice from the closed mode of the second outlet orifice into the open mode of the second outlet orifice while the first outlet orifice is in the open mode of the first outlet orifice, and then modulate the first outlet orifice from the open mode of the first outlet orifice into the closed mode of the first outlet orifice while the second outlet orifice is in the open mode of the second outlet orifice.

14. A hydronic system, comprising:

the flow control valve of claim 13, the port body including a range of angular positions for modulating the first outlet orifice within the open mode of the first outlet orifice, the main body comprising a sensor port connectable with a flow sensor to sense a flow rate of the fluid through the inlet;

a direct expansion coil operable with a condenser to cool an incoming airstream, the direct expansion coil being in the airstream;

a hydronic coil operable to heat the incoming airstream, the hydronic coil being in the airstream downstream from the direct expansion coil;

a controller; and the flow sensor, the flow sensor being connected to the sensor port and being in electronic communication with the controller;

the first outlet orifice being fluidly connected to the hydronic coil, the second outlet orifice being fluidly connected to the condenser, the actuator being in electronic communication with the controller, the controller is operable, in response to a call signal from a space sensor, with the flow sensor to produce a control signal, and the actuator being operable to pivot the port body about the pivot axis to modulate each of the first outlet orifice and the second outlet orifice in response to the control signal.

15. The hydronic system of claim 14, further comprising a space sensor in electronic communication with the controller, and wherein the controller is operable to produce the control signal in response to a dehumidification call signal from the space sensor to operate the actuator to modulate:

a) the first outlet orifice to the open mode of the first outlet orifice and to operate the hydronic coil to heat the incoming airstream, and b) the second outlet orifice to the open mode of the second outlet orifice and to operate the direct expansion coil to cool the incoming airstream.

16. The flow control valve of claim 1, wherein:

the inlet is coaxial with the pivot axis;

the first outlet orifice opens radially relative to the pivot axis; and the second outlet orifice opens radially relative to the pivot axis.

17. A flow control valve, comprising:

a main body;

an outlet defined in the main body;

a first inlet orifice defined in the main body, the first inlet orifice being modulatable between:

a closed mode of the first inlet orifice in which the first inlet orifice is substantially sealed from the outlet, and an open mode of the first inlet orifice in which the first inlet orifice is fluidly connected to the outlet;

a second inlet orifice defined in the main body, the second inlet orifice being distinct from the first inlet orifice and being modulatable between:

a closed mode of the second inlet orifice in which the second inlet orifice is substantially sealed from the outlet, and an open mode of the second inlet orifice in which the second inlet orifice is fluidly connected to the outlet; and a port body disposed in the main body and being pivotable relative to the main body about a pivot axis, the port body having a first port and a second port defined in the port body, the second port being distinct from the first port, the first port and the second port being fluidly connected to the outlet of the main body, the port body being pivotable relative to the main body about the pivot axis between a first position and a second position, the first port selectively fluidly connecting the first inlet orifice to the outlet, the first port being substantially out of alignment with the first inlet orifice when the port body is in the first position and thereby defining the closed mode of the first inlet orifice, the second port selectively fluidly connecting the second inlet orifice to the outlet, the second port being substantially out of alignment with the second inlet orifice when the port body is in the first position and thereby defining the closed mode of the second inlet orifice, the first port and the second port being disposed, sized, and shaped relative to each other in the port body such that the port body is pivotable about the pivot axis:
within a first range of positions of the port body about the pivot axis to modulate the first inlet orifice between the closed mode and the open mode of the first inlet orifice while the second inlet orifice is in the closed mode of the second inlet orifice; and
within a second range of positions of the port body about the pivot axis to modulate the second inlet orifice between the closed mode and the open mode of the second inlet orifice while the first inlet orifice is in the closed mode of the first inlet orifice.

18. The flow control valve of claim 17, wherein the open mode of each of the first inlet orifice and the second inlet orifice includes a most-open position of that inlet orifice and a partially open position of that inlet orifice.

19. The flow control valve of claim 18, wherein:
the first inlet orifice is modulatable within the open mode of the first inlet orifice while the second inlet orifice is in the open mode of the second inlet orifice; and
the second inlet orifice is modulatable within the open mode of the second inlet orifice while the first inlet orifice is in the open mode of the first inlet orifice.

20. The flow control valve of claim 19, wherein:
the first inlet orifice has a first effective diameter;
the second inlet orifice has a second effective diameter; and
the first inlet orifice and the second inlet orifice are modulatable to decrease the first effective diameter simultaneously with the second effective diameter.

21. The flow control valve of claim 17, wherein:
the outlet is coaxial with the pivot axis;
the first inlet orifice opens radially relative to the pivot axis; and
the second inlet orifice opens radially relative to the pivot axis.

22. A flow control valve, comprising:
a main body;
an inlet defined in the main body;
a first outlet orifice defined in the main body;
a second outlet orifice defined in the main body, the second outlet orifice being different from the first outlet orifice; and
a port body disposed in the main body and being pivotable relative to the main body about a pivot axis, the port body having a first port and a second port defined in the port body, the second port being distinct from the first port, the first port and the second port being fluidly connected to the inlet of the main body, the port body being pivotable relative to the main body about the pivot axis between a first position and a second position, the first port selectively fluidly connecting the first outlet orifice to the inlet, the first port being substantially out of alignment with the first outlet orifice when the port body is in the first position and thereby defining the closed mode of the first outlet orifice, the second port selectively fluidly connecting the second outlet orifice to the inlet, the second port being substantially out of alignment with the second outlet orifice when the port body is in the first position and thereby defining the closed mode of the second outlet orifice;
the first port and the second port being disposed, sized, and shaped relative to each other in the port body such that pivoting of the port body from the first position to the second position in a first direction about the pivot axis brings the first port and the second port in and out of alignment with corresponding ones of the first outlet orifice and second outlet orifice to:
modulate the first outlet orifice from the closed mode of the first outlet orifice into an open mode of the first outlet orifice while the second outlet orifice is in the closed mode of the second outlet orifice, the first outlet orifice being at least in part aligned with the first port when the first outlet orifice is in the open mode of the first outlet orifice, then
modulate the second outlet orifice from the closed mode of the second outlet orifice into an open mode of the second outlet orifice while the first outlet orifice is in the open mode of the first outlet orifice, the second outlet orifice being at least in part aligned with the second port when the second outlet orifice is in the open mode of the second outlet orifice, and then
modulate the first outlet orifice from the open mode of the first outlet orifice into the closed mode of the first outlet orifice while the second outlet orifice is in the open mode of the second outlet orifice.

23. The flow control valve of claim 22, wherein the first port is sized and shaped such that modulating the first outlet orifice from the closed mode of the first outlet orifice into the open mode of the first outlet orifice while the second outlet orifice is in the closed mode of the second outlet orifice modulates the first outlet orifice to increase an effective diameter of the first outlet orifice.

24. The flow control valve of claim 23, wherein the first port is sized and shaped such that modulating the second outlet orifice from the closed mode of the second outlet orifice into the open mode of the second outlet orifice while the first outlet orifice is in the open mode of the first outlet orifice modulates the first outlet orifice to reduce the effective diameter of the first outlet orifice.

25. The flow control valve of claim 23, wherein the second port is sized and shaped such that modulating the first outlet orifice from the open mode of the first outlet orifice into the closed mode of the first outlet orifice while the second outlet orifice is in the open mode of the second outlet orifice modulates the second outlet orifice to reduce an effective diameter of the second outlet orifice.

26. The flow control valve of claim 23, wherein the first port and the second port are disposed, sized, and shaped relative to each other such that when the inlet is connected to the supply of the fluid and the second outlet orifice is in the closed mode of the second outlet orifice, none of the fluid passes through the second outlet orifice.

27. The flow control valve of claim 22, wherein:
when the port body is in the second position, the first outlet orifice is in the closed mode of the first outlet orifice, and the second outlet orifice is in the closed mode of the second outlet orifice; and
pivoting of the port body from the second position to the first position in a second direction about the pivot axis, the second direction being opposite the first direction, brings the first port and the second port in and out of alignment with corresponding ones of the first outlet orifice and second outlet orifice to:
modulate the second outlet orifice from the closed mode of the second outlet orifice into the open mode of the second outlet orifice while the first outlet orifice is in the closed mode of the first outlet orifice, then
modulate the first outlet orifice from the closed mode of the first outlet orifice into the open mode of the first outlet orifice while the second outlet orifice is in the open mode of the second outlet orifice, and then modulate the second outlet orifice from the open mode of the second outlet orifice into the closed mode of the second outlet orifice while the first outlet orifice is in the open mode of the first outlet orifice.

28. The flow control valve of claim 27, wherein pivoting of the port body from the second position to the first position in the second direction about the pivot axis includes, after modulating the second outlet orifice from the open mode of the second outlet orifice into the closed mode of the second outlet orifice while the first outlet orifice is in the open mode of the first outlet orifice, modulating the first outlet orifice from the open mode of the first outlet orifice into the closed mode of the outlet orifice.

29. The flow control valve of claim 22, wherein the first port and the second port are disposed, sized, and shaped relative to each other such that when the inlet is connected to a supply of a fluid and the first outlet orifice is in the closed mode of the first outlet orifice, none of the fluid passes through the first outlet orifice.

30. The flow control valve of claim 22, wherein:
the port body is pivotable relative to the main body about the pivot axis from the second position to the first position in the first direction; and
the first port and the second port are disposed, sized, and shaped relative to each other such that pivoting the port body from the second position to the first position in the first direction maintains,
the first outlet orifice in the closed mode of the first outlet orifice, and
the second outlet orifice in the closed mode of the second outlet orifice.

31. The flow control valve of claim 22, wherein:
the first port has a first length, the first length being orthogonal to the pivot axis; and
the second port has a second length, the second length being orthogonal to the pivot axis.

32. The flow control valve of claim 31, wherein:
the first port is closer to the inlet than the second port in a direction of the pivot axis;
the port body has an outer cylindrical port surface;
the first port and the second port are defined in the cylindrical port surface;
the first port is circumferentially offset from the second port on the port surface;
the first port has a first wider portion and a first narrower portion extending from the first wider portion circumferentially along the port surface;
the second port has a second wider portion and a second narrower portion extending from the second wider portion circumferentially along the port surface; and
pivoting the port body from the first position toward the second position in the first direction about the pivot axis aligns the first wider portion of the first port with the first outlet orifice, and thereafter aligns the second wider portion of the second port with the second outlet orifice.

33. The flow control valve of claim 32, wherein the first narrower portion of the first port is aligned with the first outlet orifice when the second wider portion of the second port is aligned with the second outlet orifice; and
wherein the first wider portion narrows toward the first narrower portion more steeply than the second wider portion narrows toward the second narrower portion.

34. The flow control valve of claim 33, wherein:
the first outlet orifice is circular and has a first diameter;

the first narrower portion has a width that is smaller than the first diameter of the first outlet orifice;
the second outlet orifice is circular and has a second diameter; and
the second narrower portion has a width that is smaller than the second diameter of the second outlet orifice.

35. The flow control valve of claim 22, wherein:
the first port is symmetric about a first plane orthogonal to the pivot axis; and
the second port is symmetric about a second plane orthogonal to the pivot axis.

36. The flow control valve of claim 22, wherein:
the main body has an inner surface that defines a cylindrical recess therein about the pivot axis;
the port body has an outer cylindrical port surface and is received in the cylindrical recess; and
the port surface of the port body and the inner surface of the main body define a space therebetween, the space being empty but for the fluid when the flow control valve is in use.

37. The flow control valve of claim 22, wherein the main body defines a sensor port therein upstream of the first port and the second port, the sensor port being connectable with a flow sensor to sense a flow rate of the fluid through the inlet.

38. A hydronic system, comprising:
the flow control valve of claim 37;
a direct expansion coil operable with a condenser to cool an incoming airstream,
a hydronic coil operable to heat the incoming airstream and being positioned in the airstream downstream of the direct expansion coil,
a controller,
an actuator connected to the port body, and
the flow sensor, the flow sensor being connected to the sensor port and being in electronic communication with the controller;
the first outlet orifice being fluidly connected to the hydronic coil,
the second outlet orifice being fluidly connected to the condenser,
the actuator being in electronic communication with the controller,
the controller being operable, in response to a call signal from a space sensor, with the flow sensor to produce a control signal, and
the actuator being operable to pivot the port body about the pivot axis to modulate each of the first outlet orifice and the second outlet orifice in response to the control signal.

39. The hydronic system of claim 38, wherein the controller is operable to produce the control signal, in response to a dehumidification call signal from the space sensor, to operate the actuator to pivot the port body about the pivot axis to modulate:
the first outlet orifice to the open mode of the first outlet orifice and to operate the hydronic coil to heat the airstream, and
the second outlet orifice to the open mode of the second outlet orifice and to operate the direct expansion coil to cool the airstream.

40. The flow control valve of claim 22, wherein:
the first outlet orifice comprises a first sensor port connectable with a first flow sensor to sense a flow rate of the fluid through the first outlet orifice; and
the second outlet orifice comprises a second sensor port connectable with a second flow sensor to sense a flow rate of the fluid through the second outlet orifice.

41. The flow control valve of claim 22, wherein:
the inlet is coaxial with the pivot axis; and
the first outlet orifice opens radially relative to the pivot axis; and
the second outlet orifice opens radially relative to the pivot axis.

* * * * *